US008660536B1

(12) United States Patent
Pogue et al.

(10) Patent No.: US 8,660,536 B1
(45) Date of Patent: Feb. 25, 2014

(54) MOBILE DEVICE MANAGEMENT SOLUTION

(71) Applicant: Enterprising Apps, LLC, Benton, KY (US)

(72) Inventors: Jeremy Pogue, Hopkinsville, KY (US); Robert G. Pace, Benton, KY (US)

(73) Assignee: Enterprising Apps, LLC, Benton, KY (US)

( * ) Notice: Subject to any disclaimer, the term of this patent is extended or adjusted under 35 U.S.C. 154(b) by 48 days.

(21) Appl. No.: 13/708,084

(22) Filed: Dec. 7, 2012

(51) Int. Cl.
*H04M 1/66* (2006.01)

(52) U.S. Cl.
USPC ......... 455/411; 455/419; 455/456.3; 455/444

(58) Field of Classification Search
USPC ........... 455/410–411, 414.1–414.4, 418–420, 455/552.1–553.1, 436–444; 370/328, 370/331–334, 338
See application file for complete search history.

(56) References Cited

U.S. PATENT DOCUMENTS

| 8,254,902 B2 | 8/2012 | Bell et al. | |
| 2007/0183427 A1* | 8/2007 | Nylander et al. | 370/395.2 |
| 2010/0002661 A1* | 1/2010 | Schmidt et al. | 370/338 |
| 2010/0265827 A1* | 10/2010 | Horn et al. | 370/241 |
| 2011/0044240 A1* | 2/2011 | Jang et al. | 370/328 |

OTHER PUBLICATIONS

Ip access, "nanoGSM, The world's most deployed GSM picocell," website: http://ipaccess.com/en/nanoGSM-picocell , accessed May 16, 2013 (2 pages).
Cisco Aironet Access Point Modules, Cisco 3G Small Cell Module for Cisco Aironet Data Sheet, website: http://www.cisco.com/en/US/prod/collateral/modules/ps12859/ps12976/data_sheet_c78-726601.html, accessed May 16, 2013 (6 pages).

* cited by examiner

*Primary Examiner* — George Eng
*Assistant Examiner* — Marcus Hammonds
(74) *Attorney, Agent, or Firm* — Frost Brown Todd LLC

(57) ABSTRACT

The use of mobile devices which are capable of communicating using uncontrolled networks (e.g., cellular networks) can be managed using multi-band access points and multi-band controllers which can monitor and apply policies to data sent over the uncontrolled networks. Technology for applying policies to data sent over uncontrolled networks can be deployed in a variety of configurations, including configurations where the application of policies is performed using functionality built into a multi-band access point, rather than a separate multi-band controller. These configurations also include configurations which use access points and/or controllers which are specifically designed for uncontrolled networks (e.g., cellular access points). Applications of this technology can be made in a wide variety of contexts, including corporate, military and law enforcement contexts.

15 Claims, 42 Drawing Sheets

To Fig 3b

Controller based
Hybrid Mode
Access Point
Processing

Standalone
Hybrid Mode
Access Point Processing
Data Processing Flow Chart

MOBILE DEVICE MANAGEMENT SOLUTION

FIELD

The disclosed technology can be used in the field of network management.

BACKGROUND

Currently there are management solutions for Wi-Fi enabled devices. These solutions do not address devices that don't need access to a controlled network, such as cellular devices. Without a management solution for these devices system owners have no way to enforce policies. As a concrete example of the negative impacts this can have, consider the case of a business owner who has implemented a policy that blocks traffic to a specific website during business hours with the exception of lunch to increase productivity. If an employee has a mobile device with a cellular connection, he or she could access the specific website even though that site is blocked on the corporate network.

The harms caused by deficiencies in existing device management solutions go well beyond lost productivity. To illustrate, consider security threats to networks today. Any mobile device that is Wi-Fi enabled and also has a cellular connection could at any given time be connected to a business network and the cellular network simultaneously. This could potentially be exploited by a virus with a payload designed to detect when the mobile device is connected to a Wi-Fi network and a cellular network simultaneously. Once the virus connection criteria has been met, the virus will then initiate a scan on the network and look for any sensitive information stored on workstations or servers. Once sensitive information is discovered it is transmitted via the cellular connection to the person that wrote the virus. Now consider the implications if such an incident occurs on a major bank network. This is just one possible scenario out of many, but one that clearly demonstrates the risk with mobile devices in today's corporate networks.

Despite these significant and highly visible drawbacks to existing technology, system owners have no way to address the risk posed by devices which communicate via an uncontrolled network, such as preventing the loss of productivity, protecting network resources, or identifying devices. As a result, there is a need in the art for technology which addresses the drawbacks of existing solutions, such as by allowing system owners to manage devices that do not need access to a controlled network and/or by giving system owners the ability to enforce policies.

SUMMARY

The inventors' technology can be used to implement a hardware and software based solution designed to address one or more of the problems above for businesses and system administrators around the world. Such a solution can give system administrators a single point of management for mobile devices no matter if they are connected to the corporate Wi-Fi network or the Cellular network. Such a solution can involve merging wireless access point type devices with cellular signal booster type devices into a single type of access point used for both Wi-Fi and cellular frequencies and can also incorporate controllers which handle communications and administration on each of these frequencies much like the Wi-Fi wireless LAN controllers that exist on the market today. Once you have deployed the multi-band access points properly the entire building or campus in which they are deployed will be covered in a RF umbrella. This RF umbrella consisting of both Wi-Fi and cellular frequencies are managed by either by the multi-band access point or a multi-band wireless LAN controller. The inventors' technology can also use one or more cellular only access points, which can be deployed either standalone or with a cellular only controller, if the system owner does not wish to combine cellular management with Wi-Fi management.

Such a solution could be deployed with many different configurations depending on the desired mode of operation. When deployed system owners have the ability to configure polices that can be applied to all traffic traversing the multi-band access point regardless of Wi-Fi or cellular connection from the mobile device(s).

BRIEF DESCRIPTION OF THE DRAWINGS

The drawings and detailed description which follow are intended to be merely illustrative and are not intended to limit the scope of the inventors' technology as contemplated by the inventors.

DETAILED DESCRIPTION

Figure 1:
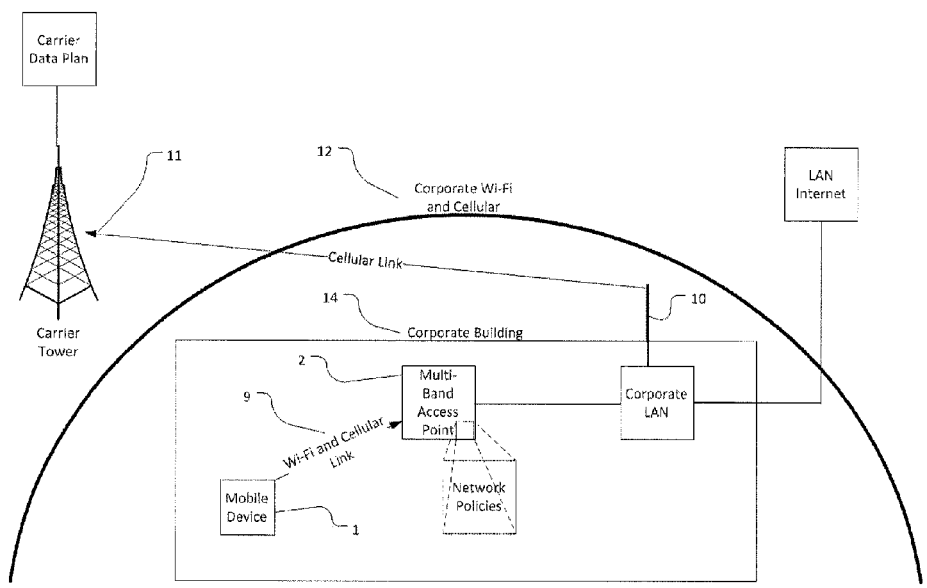
FIG. 1 shows a simplified corporate network.

The inventors have conceived of novel technology which can be used to manage devices which do not require access to a controlled network (e.g., cellular devices). For the purpose of illustration, this disclosure focuses on how the inventors' technology can be deployed and used in the context of allowing a business to enforce policies for all devices on its premises, not only devices which connect to the business' corporate network. While the application of the inventors' technology in this manner satisfies a long-felt but unmet need in the art, it should be understood that the inventors' technology can be used in contexts and configurations beyond the business contexts and configurations which are the focus of the following disclosure. Accordingly, the discussion in this document should be understood as being illustrative only of the inventors' technology, and should not be treated as imposing or implying limits on the same.

As used herein, the term "corporate Internet connections" refers generally and without limitation to any connection that can connect the network in which he inventors' technology is deployed to the Internet. For example, one type of corporate Internet connection could be a business Internet connection (e.g. T1, MPLS, EVPN, DSL, Cable, or other Broadband). Another type of corporate Internet connection could be a cellular antenna. Another type of corporate Internet connection could be a cellular data card. Another type of corporate Internet connection could be a device capable of a mobile hot spot. In some embodiments multiple connections could be used simultaneously (e.g. broadband and cellular antenna). In another embodiment multiple connections could be used in a standby or failover configuration.

As used herein, the term "access point", "multi-band access point" or "AP" refers generally and without limitation to a network access point which allows access for one device to one or more other networks. For example, one type of access point might comprise an Ethernet router with Wi-Fi. Another type of access point might comprise an IEEE standard 802.11 Wi-Fi access point. Another type of access point might comprise of a cellular repeater. Another type of access point might comprise a multi-frequency access point that allows access for one device on both Wi-Fi and Cellular. Another type of access point might comprise of a Picocell. Another type of access point might comprise of a Femtocell. These terms should in no way be construed as to be limiting to a particular network standard, protocol, or topology.

As used herein, the term "controller" or "multi-band controller" refers generally and without limitation to a device at is used to manage access point(s). For example, one type of controller might comprise of a device that manages multiple IEEE standard 802.11 Wi-Fi access points. Another type of controller might comprise of a device that manages multiple Picocell access points. Another type of controller might be a device that manages multiple Femtocell access points. This term should in no way be construed as to be limiting to a particular network standard, protocol, or topology As used herein, the term "cellular" or "cell" refers without limitation to any wireless telecommunications (and/or data) apparatus or system providing multiple user access including for example those of the 2G, 2.5G, 3G, 4G, AMPS, or LTE families. Some well known cellular standards and technologies include e.g., UMTS, GSM, 3GPP/WCDMA, 3GPP2 (CDMA2000), IS-95, IS-136, IS-54, NAMPS, and PCS-1900.

As used herein, the term "mobile device" include, but are not limited to, personal computers (PC), minicomputers, whether desktop, laptop, or otherwise, and mobile devices such as handheld computers, PDAs, personal media devices (PMDs), smartphones, tablets, multi-function media, and telephony devices regardless of software or operating system installed on said device.

As used herein, the terms "policy" and "network policies" include, but are not limited to, policies which can be defined in some systems implemented according to the invention that apply to mobile devices connected via air interface. The types of policies include, but are not limited to content filtering, antivirus, malware, voice, data, sms, location, movement, and security based policies.

The user of a mobile device may be required or given the opportunity to "opt in" or give consent for one or more policies being enforced according to the invention, the assent to which may be used as a precondition for forming a wireless association, or security association, or maintaining and existing one.

In one variant, the inventors' technology comprises of one or more policies that provide the owner of a mobile device a consent page. User consent can be sent to the mobile device upon the device entering the area of policy enforcement. The resulting action of the mobile device owner (e.g., give consent, deny consent) can result in the mobile device being granted an association, denied an association, or maintain an existing association.

In another variant, the inventors' technology comprises one or more policies that provide content filtering to traffic generated or received by a mobile device via air interface (e.g, Cellular, Wi-Fi). Content filtering policies can monitor content request from/to the mobile device when the device is within the range of policy enforcement. Content filtering policies and allow or disallow access to content on remote networks (e.g., Internet access, application access, resource access).

In another variant, the inventors' technology comprises one or more policies that provide anti-virus filtering to traffic generated or received by a mobile device via air interface (e.g., Cellular, Wi-Fi). Anti-virus policies can monitor traffic from/to the mobile device when the device is within the range of policy enforcement. Anti-virus policies could scan for, detect, block, quarantine, and report the findings of suspicious traffic considered to be a virus.

In another variant, the inventors' technology comprises one or more policies that provide malware detection to traffic generated or received by a mobile device via air interface. (e.g., Cellular, Wi-Fi). Malware policies can monitor traffic from/to the mobile device when the device is within the range of policy enforcement. Malware policies could scan for, detect, block, quarantine, and report the findings of suspicious traffic considered to be a Malware.

In another variant, the inventors' technology comprises one or more policies that enforce security to traffic generated or received by a mobile device via air interface. (e.g., Cellular, Wi-Fi). Security policies can monitor traffic from/to the mobile device when the device is within the range of policy enforcement. Security policies could block or allow access to resources.

In another variant, the inventors' technology comprises one or more policies that identify devices that are connected to a network via air interface. (e.g., Cellular, Wi-Fi). Device identification policies could detect any device that enters the range of policy enforcement. Device identification policies could log and report identification information for a mobile device.

In another variant, the inventors' technology comprises one or more policies that identify the location of devices that are connected to a network via air interface. (e.g., Cellular, Wi-Fi). Device location policies could apply to any device that enters the range of policy enforcement. Device location policies could log and report the location of a mobile device utilizing any suitable location data (e.g., GPS, carrier tower location, access point location)

In another variant, the inventors' technology comprises one or more policies that monitor SMS traffic generated or received by a mobile device via air interface. (e.g., Cellular, Wi-Fi). SMS policies can monitor traffic from the mobile device when the device is within the range of policy enforcement. SMS policies can monitor and block the number of SMS messages that are sent and/or received to a mobile device.

In another variant, the inventors' technology comprises one or more policies that monitor Voice (e.g., voice calls, VOIP traffic) traffic generated or received by a mobile device via air interface. (e.g., Cellular, Wi-Fi). Voice policies can monitor traffic from the mobile device when the device is within the range of policy enforcement. Voice policies can monitor and block the number of voice calls that are made and/or received to a mobile device.

In another variant, the inventors' technology comprises one or more policies that monitor traffic (e.g., voice, sms, data) generated or received by a mobile device via air interface. (e.g., Cellular, Wi-Fi) during predefined times. Time policies can monitor traffic from the mobile device when the device is within the range of policy enforcement. Time policies can monitor and block traffic from/to a mobile device during defined times.

In another variant, the inventors' technology comprises one or more policies that monitor traffic (e.g., voice, sms, data) generated or received by a mobile device via air interface. (e.g., Cellular, Wi-Fi) logging the amount of traffic. Volume policies can monitor traffic from the mobile device when the device is within the range of policy enforcement. Volume policies can monitor and block traffic from/to a mobile device once they have reached a define threshold (e.g., limit to 2 calls a day, limit to 10 sms a day, limit to 10 mb a day).

Turning now to the figures, FIG. 1 shows a simplified corporate network with the inventors' technology in place. In that figure, a mobile device [1] is simultaneously connected to both the corporate Wi-Fi network and the cellular network. However both connections are made through the multi-band access point [2] via the Wi-Fi and Cellular Link [9]. Because of this, the multi-band access point [2] could analyze the traffic from the mobile device [1] and give the system owners the ability to enforce policies. This enforcement can be done if the owner of the mobile device [1] uses the Wi-Fi connection or the cellular connection on the mobile device [1]. Using multi-band access point(s) [2] a corporate Wi-Fi and Cellular network [12] is created and acts like an umbrella over the corporate building [14]. Any device that enters this umbrella is automatically redirected to the multi-band access point [2] and unable to make a direct cellular connection to the carrier tower [11]. The corporate network will send traffic destined to the cellular network to the carrier tower [11] via the corporate cellular antenna [10] once policies have been applied to the traffic. In FIG. 1 the corporate internet connection is represented by a corporate cell antenna [10], though other types of corporate internet connections could be used to send traffic destined to the cellular network.

Figure 2:
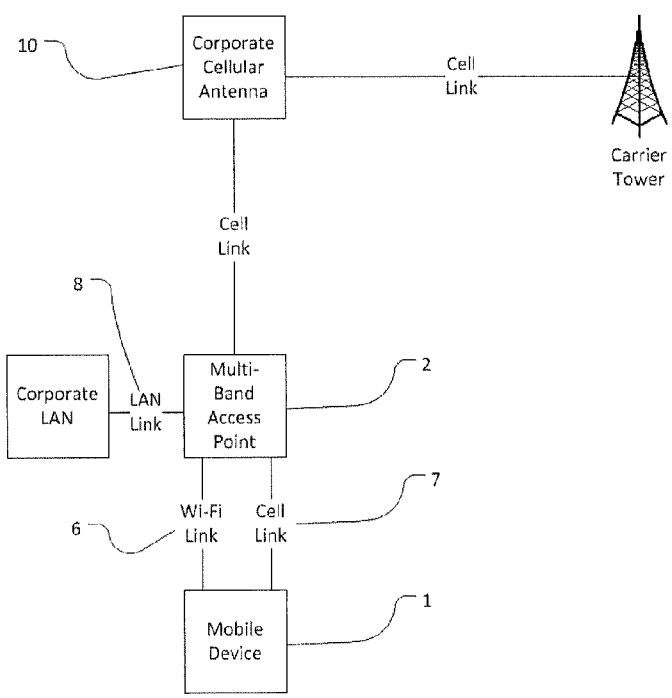
FIG. 2 shows a component block diagram of the inventors' technology in Standalone Parallel Mode.

FIG. 2 shows the inventors' technology deployed to run in a mode in which a system is deployed with a single multi-band access point or with only a few multi-band access points without a multi-band controller. This mode, referred to as "Standalone Parallel Mode," can be deployed with a single multi band access point or multiple multi band access points. When the system is deployed in Standalone Parallel Mode the mobile device(s) [1] communicates with the multi-band access point [2] with two separate data streams, a Wi-Fi Link [6] and a cell link [7]. The multi-band access point [2] will receive the data streams from the mobile device [1] in parallel mode keeping the traffic separate. The multi-band access point [2] will analyze both data streams and apply corporate policies to the cell link [7] data stream and the Wi-Fi link [6] data stream. Once security policy(s) have been applied to the data streams, the multi-band access point [2] will forward Wi-Fi Link [6] traffic to the LAN link [8] and cell link [7] to the corporate cellular antenna [10], or will block the attempts at communication as appropriate. If attempts at communications are blocked based on policies different actions can be applied based on the policy configuration (e.g. error code returned to mobile device [1], mobile device [1] redirected to support page). In FIG. 2 the corporate internet connection is represented by a corporate cell antenna [10], though other types of corporate internet connections could be used to send traffic destined to the cellular network.

Figure 3A:
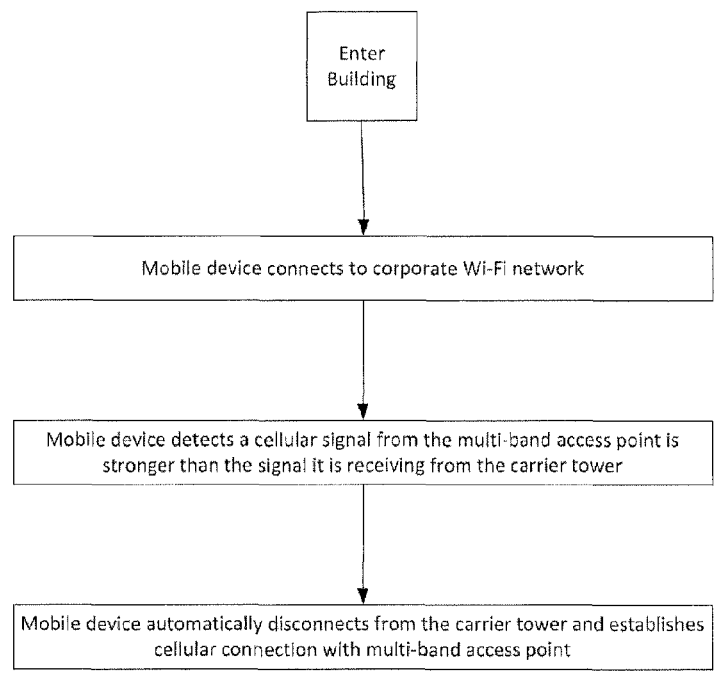
FIG. 3a shows a data processing flow chart of the inventors' technology in Standalone Parallel Mode.
Figure 3B:
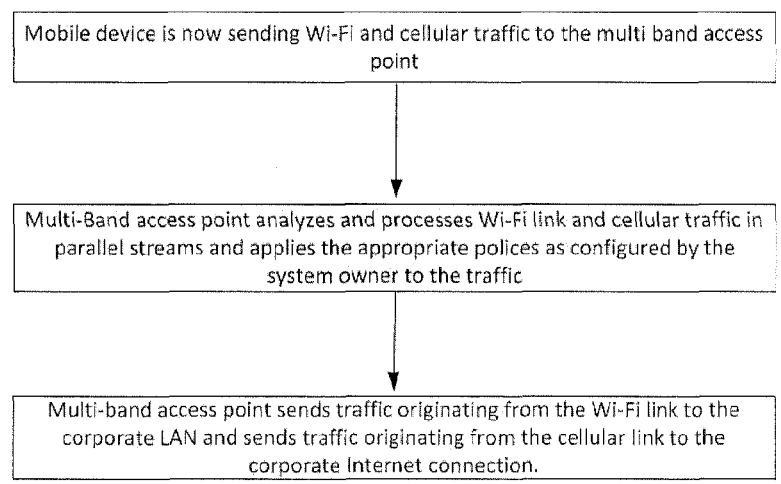
FIG. 3b shows a continuation of a data processing flow chart of the inventors' technology in Standalone Parallel Mode.

FIGS. 3a and 3b show a data processing flow chart for the inventors' technology configured in Standalone Parallel Mode.

Figure 4:
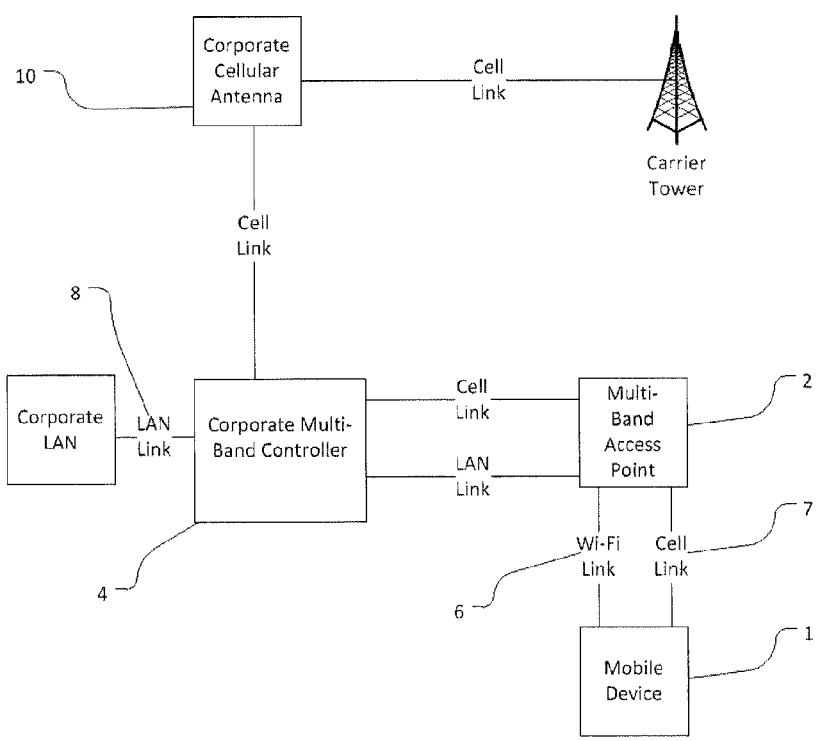
FIG. 4 shows a component block diagram of the inventors' technology in Controller Based Parallel Mode.

FIG. 4 shows the inventors' technology configured in a mode which can be used when the system is deployed with a corporate multi-band controller. When the inventors' technology is deployed in this mode, referred to as "Controller Based Parallel Mode," the mobile device(s) [1] communicate with the multi-band access point [2] with two separate data streams, a Wi-Fi link [6] and a cell link [7]. The multi-band access point [2] then forwards the data streams to the corporate multi-band controller [4]. The corporate multi-band controller [4] will then analyze both data streams and apply policies as configured by the system owner to traffic originating from the cell link [7] data stream and the Wi-Fi link [6] data stream. Once security policy(s) have been applied to the data streams, the corporate multi-band controller [4] will forward traffic originating from the Wi-Fi link [6] to the corporate LAN via LAN link [8] and traffic originating from the cell link [7] to the corporate cellular antenna [10] or will block the attempts at communication as appropriate. If attempts at communications are blocked based on policies different actions can be applied based on the policy configuration (e.g. error code returned to mobile device [1], mobile device [1] redirected to support page). In FIG. 4 the corporate internet connection is represented by a corporate cell antenna [10], though other types of corporate internet connections could be used to send traffic destined to the cellular network.

Figure 5A:
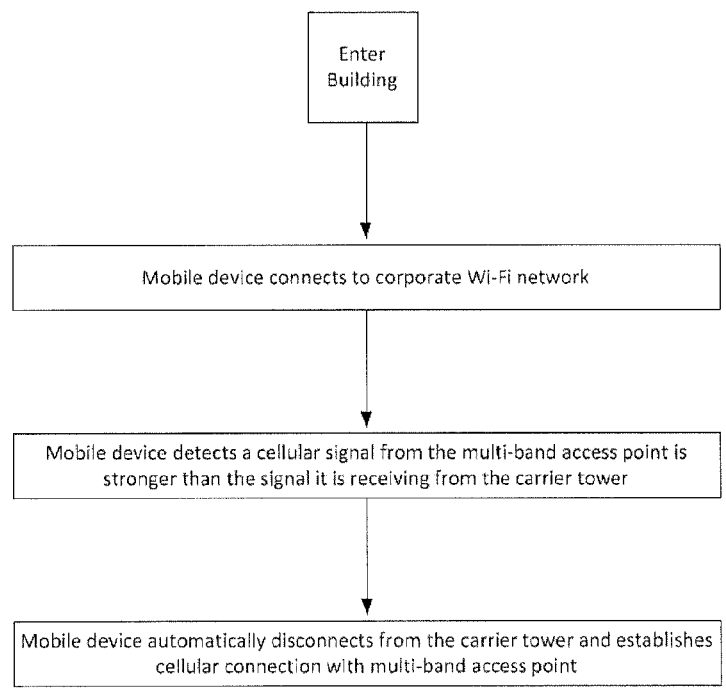
FIG. 5a shows a data processing flow chart of the inventors' technology in Controller Based Parallel Mode.
Figure 5B:
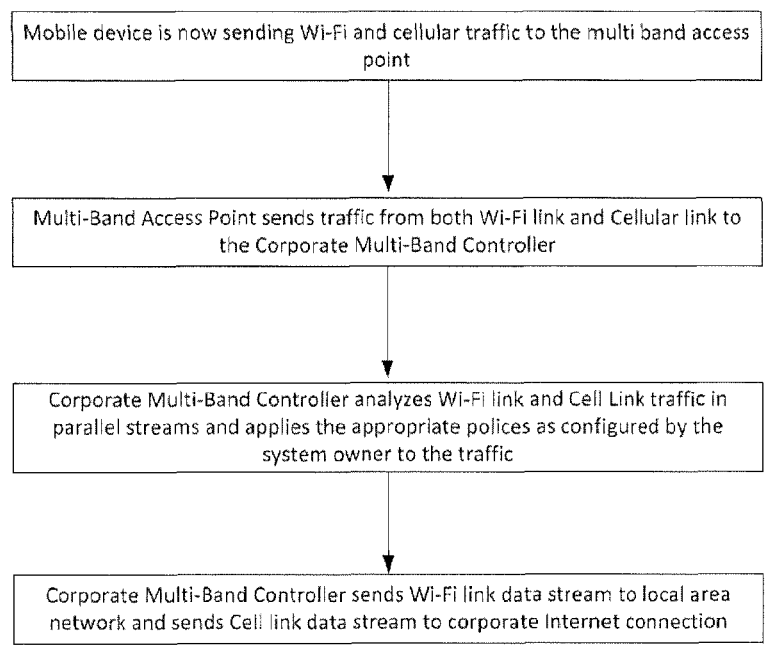
FIG. 5b shows a continuation of data processing flow chart of the inventors' technology in Controller Based Parallel Mode.

FIGS. 5a-5b show a data processing flow chart for the inventors' technology configured in Controller Based Parallel Mode.

Figure 6:
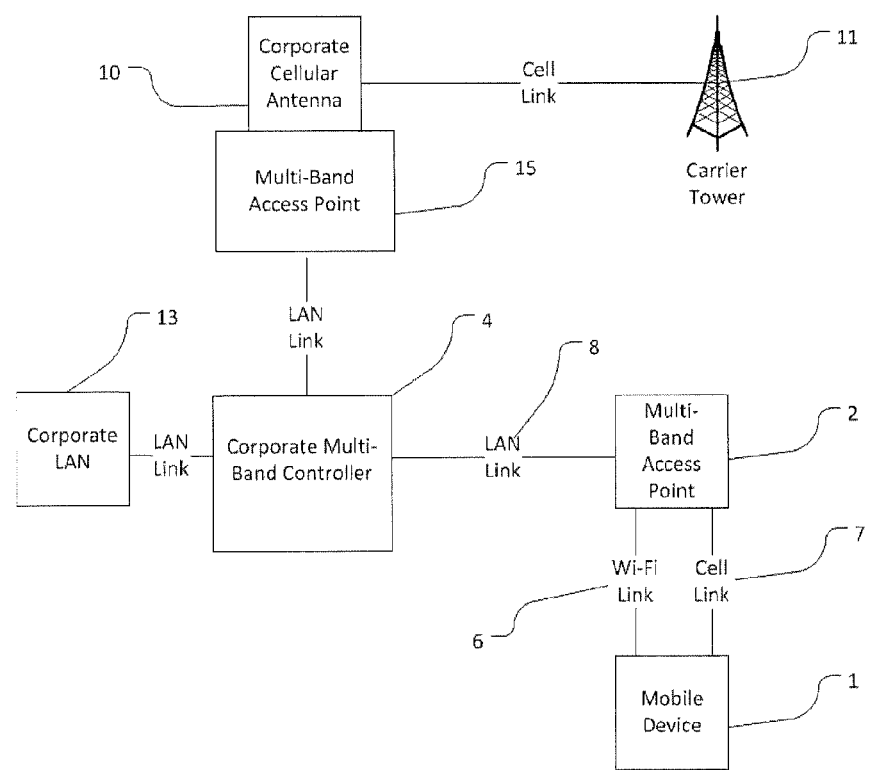
FIG. 6 shows component block diagram of the inventors' technology in Controller Based Hybrid Mode with Access Point Processing.

FIG. 6 shows the inventors' technology configured in a mode which can be used when the system is deployed with multi-band access points capable of converting the cellular data stream to a form suitable for routing over a Local Area Network. This mode of operation, referred to as "Controller Based Hybrid Mode with Access Point Processing," can add flexibility to the system by routing cellular traffic over the Local Area Network. This mode of operation may be desired by system owners who want to use a single data link to connect multi-band access points to their network. When the system is deployed in controller based hybrid mode with access point processing, the mobile device(s) [1] communicate with the multi-band access point [2] with two separate data streams, a Wi-Fi link [6] and a cell link [7]. The multi-band access point [2] converts both data streams from the Wi-Fi Link [6] and the cell link [7] to a data stream suitable for the LAN link [8] such as TCP/IP traffic. The multi-band access point [2] then forwards the data stream to the corporate multi-band controller [4] via the LAN link [8]. The corporate multi-band controller [4] will then analyze both data streams and apply corporate policies to the traffic. Once security policy(s) have been applied to the data stream the corporate multi-band controller [4] will forward traffic originating from the Wi-Fi link [6] traffic to the corporate LAN [13] and traffic originating from the cell link [7] to the corporate cellular antenna [10] or will block the attempts at communication as appropriate. If attempts at communications are blocked based on policies different actions can be applied based on the policy configuration (e.g. error code returned to mobile device [1], mobile device [1] redirected to support page). Before traffic originating from cell link [7] can be transmitted to the carrier tower [11] it should be converted back to a data stream suitable for the cellular network. This can be done with a multi-band access point [15]. In FIG. 6 the corporate internet connection is represented by a corporate cell antenna [10], though other types of corporate internet connections could be used to send traffic destined to the cellular network.

Figure 7A:
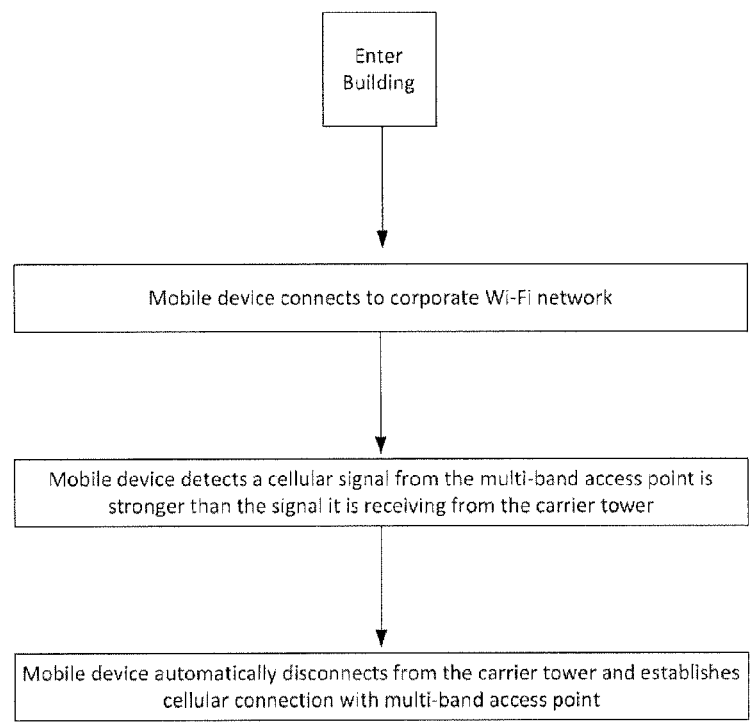
FIG. 7a shows a data processing flow chart of the inventors' technology in Controller Based Hybrid Mode with Access Point Processing.
Figure 7B:
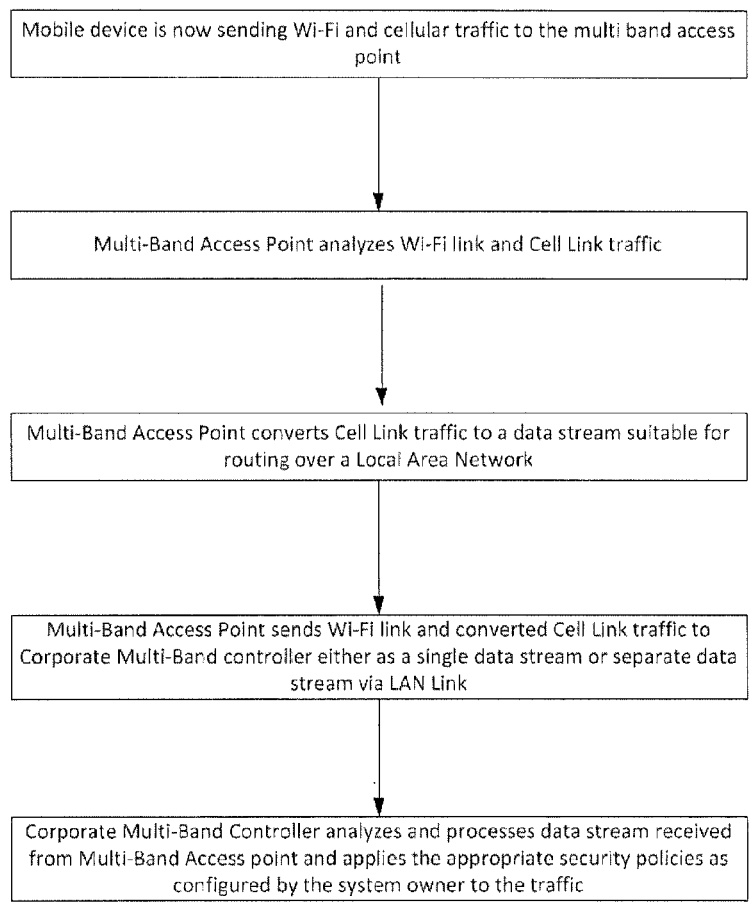
FIG. 7b shows a continuation of data processing flow chart of the inventors' technology in Controller Based Hybrid Mode with Access Point Processing.
Figure 7C:
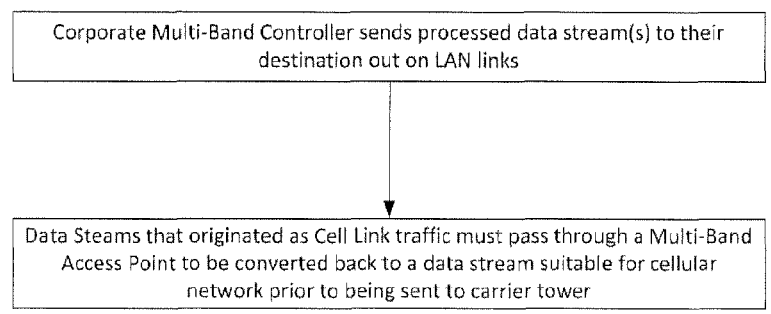
FIG. 7c shows a continuation of data processing flow chart of the inventors' technology in Controller Based Hybrid Mode with Access Point Processing.

FIGS. 7a-7c show a data processing flow chart for the inventors' technology configured in Controller Based Hybrid Mode with Access Point Processing.

Figure 8:
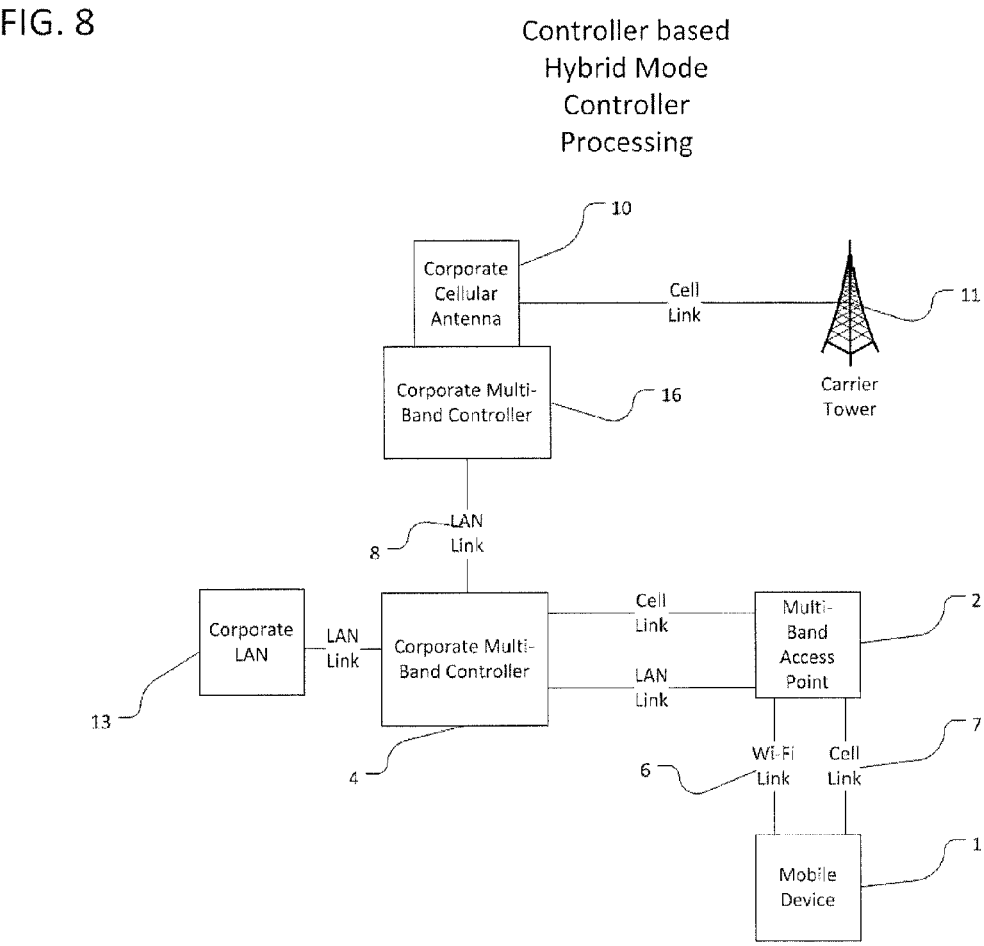
FIG. 8 shows component block diagram of the inventors' technology in Controller Based Hybrid Mode with Controller Processing.

FIG. 8 shows the inventors' technology configured in a mode which can be used when the system is deployed with corporate multi-band controller(s) capable of converting the cellular data stream to a form suitable for routing over a Local Area Network. When the system is deployed in this mode, referred to as "Controller Based Hybrid Mode with Controller Processing," the mobile device(s) [1] communicate with the multi-band access point [2] with two separate data streams, a Wi-Fi link [6] and a cell link [7] The multi-band access point [2] then forwards the data streams to the corporate multi-band controller [4]. The corporate multi-band controller [4] converts the cell link [7] traffic to a data stream suitable for the LAN Link [8]. The corporate multi-band controller [4] will then analyze both data streams and apply corporate policies to the traffic. Once security policy(s) have been applied to the data stream(s) the corporate multi-band controller [4] will forward traffic originating from the Wi-Fi link [6] to the corporate lan [13] and traffic originating from the cell link [7] to the corporate cellular antenna [10] or will block the attempts at communication as appropriate. If attempts at communications are blocked based on policies different actions can be applied based on the policy configuration (e.g. error code returned to mobile device [1], mobile device [1] redirected to support page). Before traffic originating from cell link [7] can be transmitted to the carrier tower [11] it should be converted back to a data stream suitable for the cellular network. This can be done with a second corporate multi-band controller [16]. A multi-band access point can be used to instead of a second corporate multi-band controller [16] to convert the traffic originating from cell link [7] to a data stream suitable for the cellular network if the system owner chooses to do so. In FIG. 8 the corporate internet connection is represented by a corporate cell antenna [10], though other types of corporate internet connections could be used to send traffic destined to the cellular network.

Figure 9A:
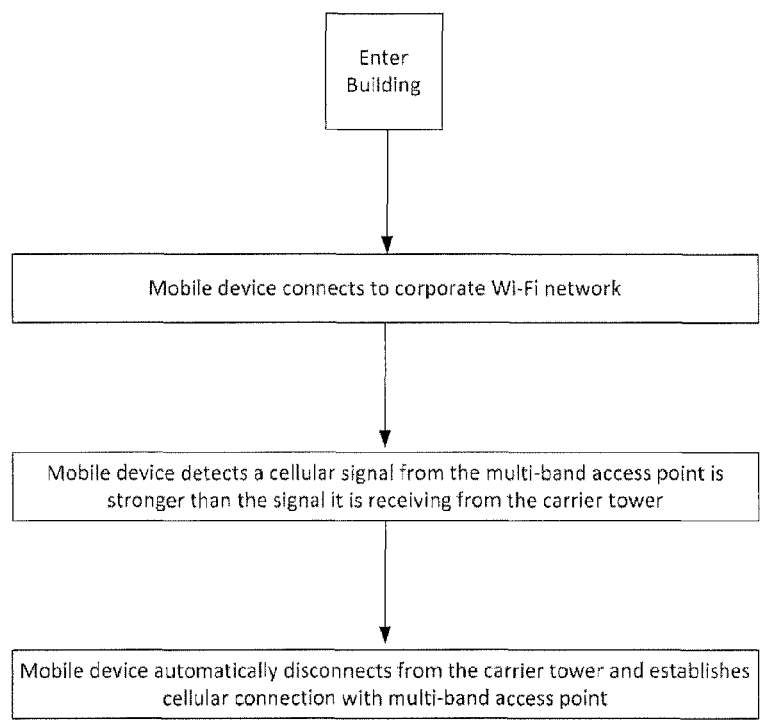
FIG. 9a shows a data processing flow chart of the inventors' technology in Controller Based Hybrid Mode with Controller Processing.
Figure 9B:
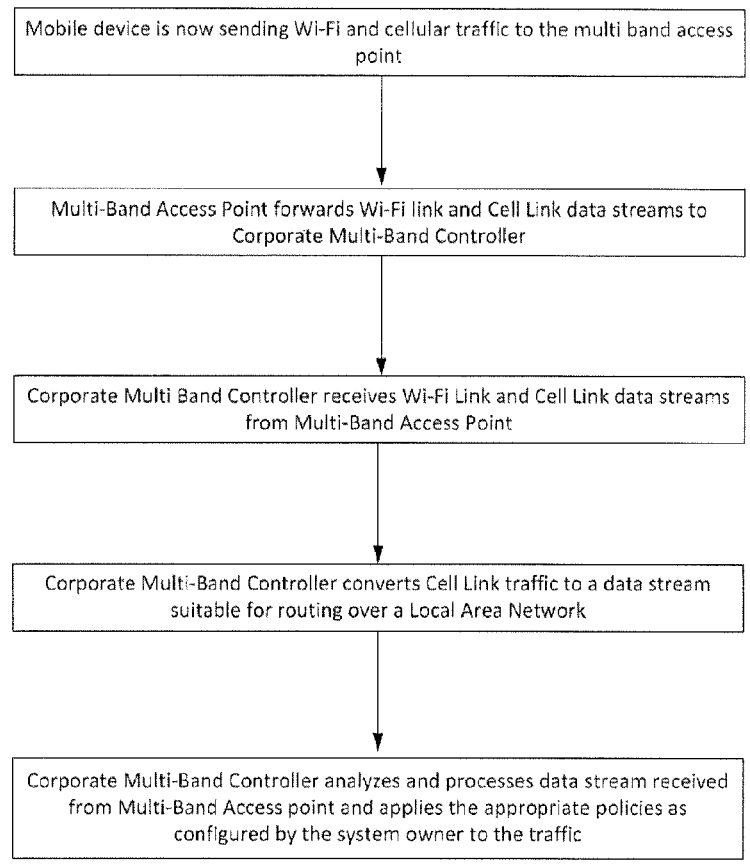
FIG. 9b shows a continuation of data processing flow chart of the inventors' technology in Controller Based Hybrid Mode with Controller Processing.
Figure 9C:
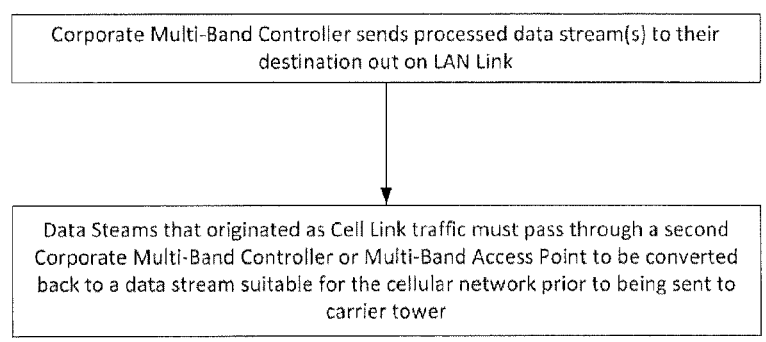
FIG. 9c shows a continuation of data processing flow chart of the inventors' technology in Controller Based Hybrid Mode with Controller Processing.

FIGS. 9a-9c show a data processing flow chart for the inventors' technology configured in Controller Based Hybrid Mode with Controller Processing.

Figure 10:
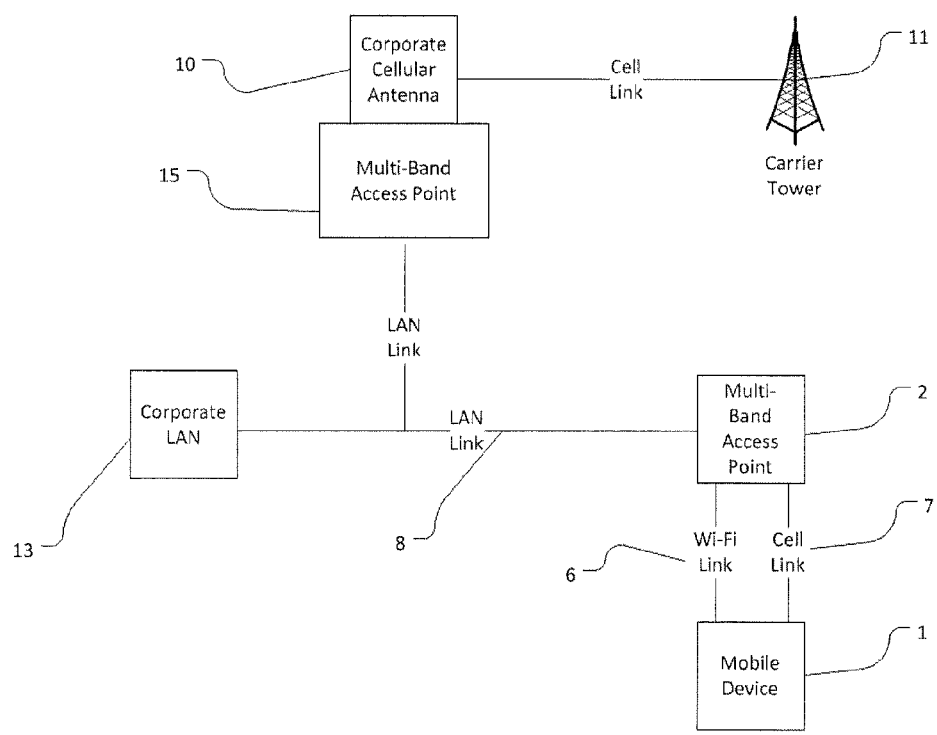
FIG. 10 shows component block diagram of the inventors' technology in Standalone Hybrid Mode with Access Point Processing.

FIG. 10 shows the inventors' technology configured in a mode which can be used when the system is deployed with multi-band access points capable of converting the cellular data stream to a form suitable for routing over a Local Area Network. When the system is deployed in this mode, referred to as "Standalone Hybrid Mode with Access Point Processing," the mobile device(s) [1] communicate with the multi-band access point [2] with two separate data streams, a Wi-Fi link [6] and a cell link [7]. The multi-band access point [2] converts both data streams from the Wi-Fi link [6] and the Cell Link [7] to a data stream suitable for the LAN Link [8].

The multi-band access point [2] will then analyze the data stream and apply corporate policies to the traffic. Once security policy(s) have been applied to the data streams the multi-band access point [2] will forward the traffic originating from the Wi-Fi link [6] traffic to the corporate LAN [13] and the traffic originating from the cell link [7] to the corporate cellular antenna [10] or will block the attempts at communication as appropriate. If attempts at communications are blocked based on policies different actions can be applied based on the policy configuration (e.g. error code returned to mobile device [1], mobile device [1] redirected to support page). Before traffic originating from cell link [7] can be transmitted to the carrier tower [11] it should be converted back to a data stream suitable for the cellular network. This can be done with a second multi-band access point [15]. In this mode policies could be applied by either multi-band access point [2] or [15] as desired by the system owner. In FIG. 10 the corporate internet connection is represented by a corporate cell antenna [10], though other types of corporate internet connections could be used to send traffic destined to the cellular network.

Figure 11A:
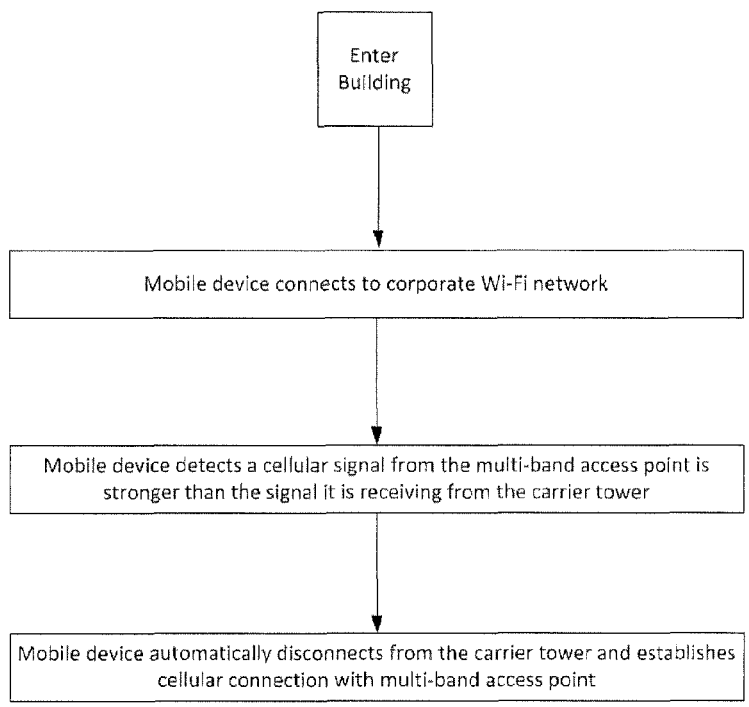
FIG. 11a shows a data processing flow chart of the inventors' technology in Standalone Hybrid Mode with Access Point Processing.
Figure 11B:
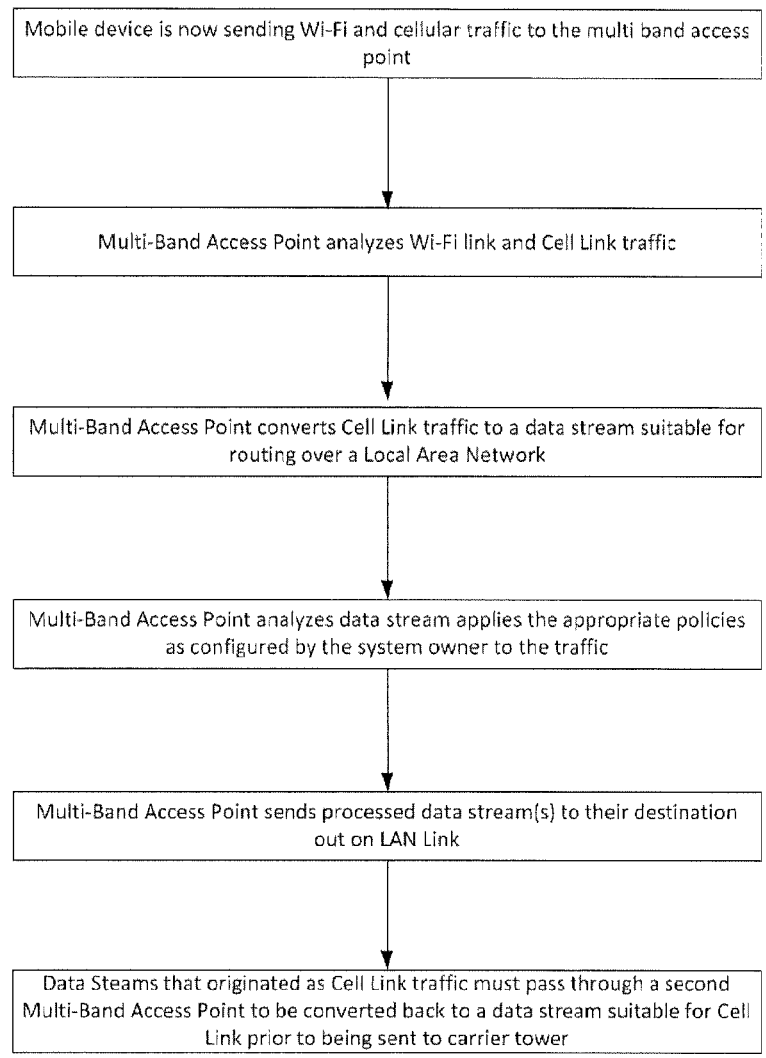
FIG. 11b shows a continuation of data processing flow chart of the inventors' technology in Standalone Hybrid Mode with Access Point Processing.

FIGS. 11a-11b show a data processing flow chart for the inventors' technology configured in Standalone Hybrid Mode with Access Point Processing.

Figure 12:
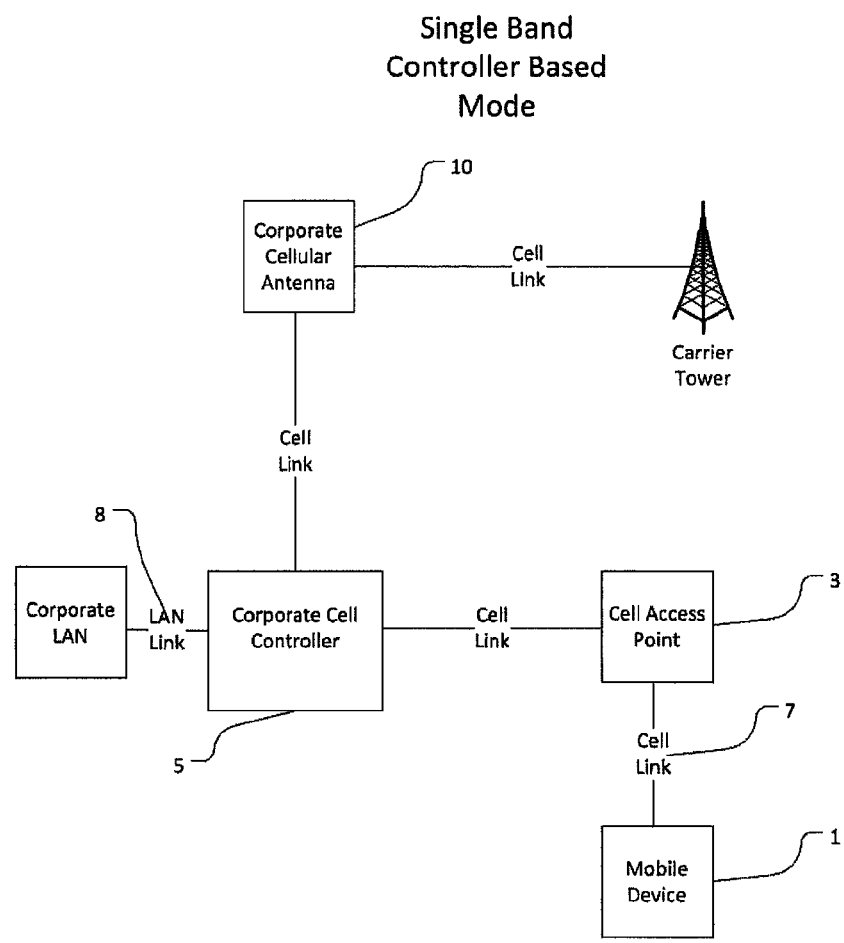
FIG. 12 shows component block diagram of the inventors' technology in Single Band Controller Based Mode.

FIG. 12 shows the inventors' technology configured in a mode which can be used when the system is deployed with cellular only access points and cellular only corporate cell controller. When the system is running in this mode, referred to as "Single Band Controller Based Mode," cell access point(s) [3] and corporate cell controller(s) [5] are used to manage the mobile device(s)' [1] cellular communications. The mobile device [1] makes a cellular connection to the cell access point [3] via cell link [7]. The cell access point [3] sends the data stream originating from the mobile device [1] to the corporate cell controller [5]. The corporate cell controller [5] will then analyze the data stream originating from the mobile device [1] and apply corporate policies to the data stream. Once security policy(s) have been applied to the data stream the corporate cell controller [5] will forward traffic originating from the mobile device [1] to the corporate cellular antenna [10] or will block the attempts at communication as appropriate. If attempts at communications are blocked based on policies different actions can be applied based on the policy configuration (e.g. error code returned to mobile device [1], mobile device [1] redirected to support page). The corporate cell controller [5] is connected to the corporate network via LAN link [8] for management of the corporate cell controller [5]. In FIG. 12 the corporate internet connection is represented by a corporate cell antenna [10], though other types of corporate internet connections could be used to send traffic destined to the cellular network.

Figure 13A:
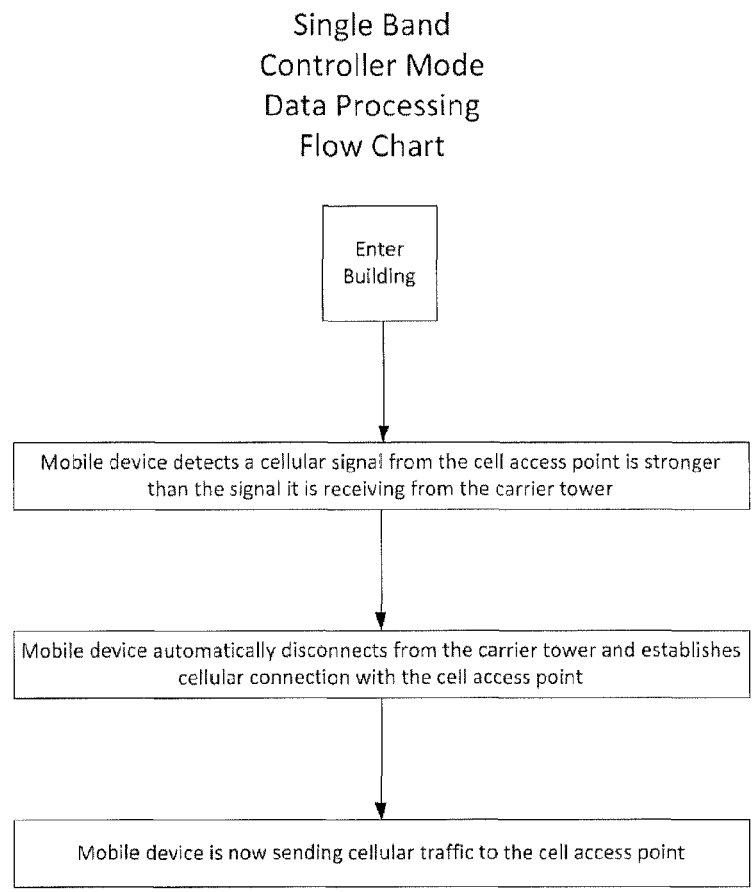
FIG. 13a shows a data processing flow chart of the inventors' technology in Single Band Controller Based Mode.
Figure 13B:
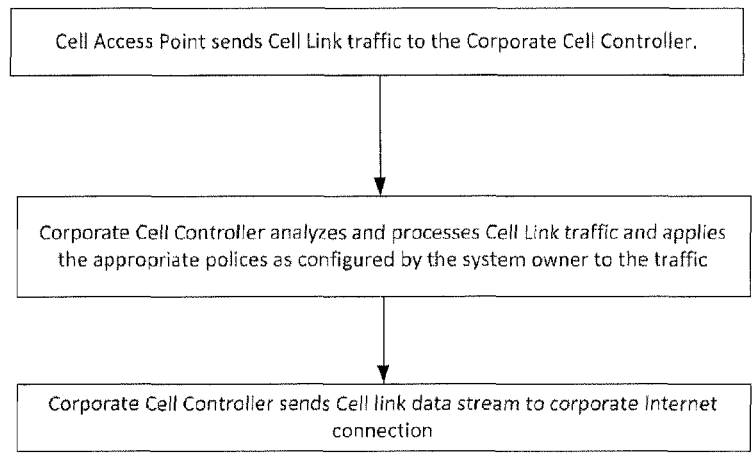
FIG. 13b shows a continuation of data processing flow chart of the inventors' technology in Single Band Controller Based Mode.

FIGS. 13a-13b show a data processing flow chart for the inventors' technology configured in Single Band Controller Mode.

Figure 14:
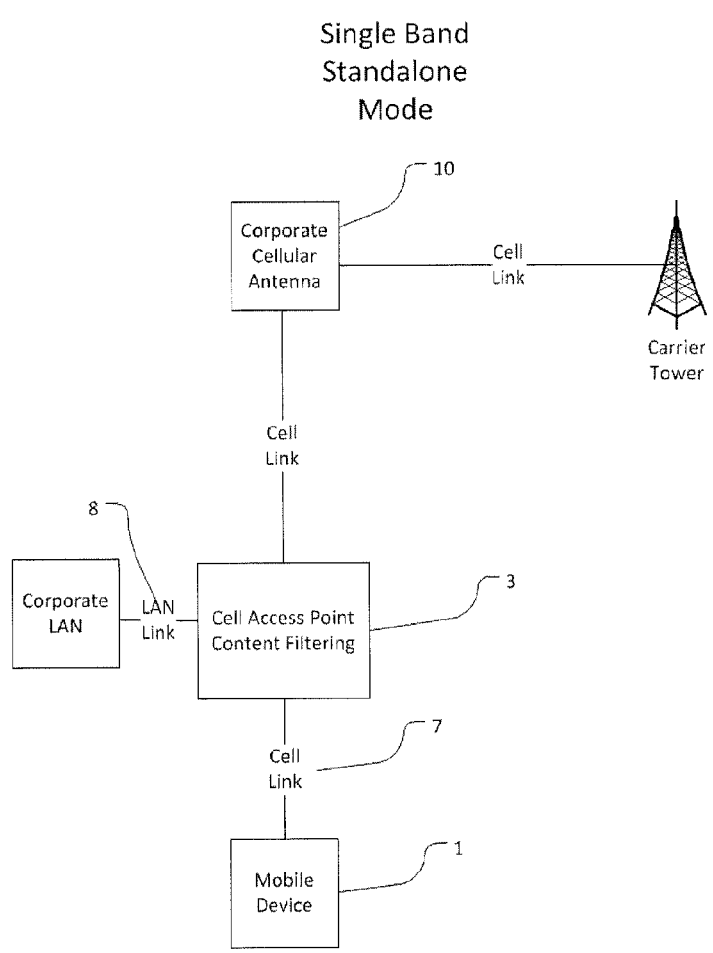
FIG. 14 shows component block diagram of the inventors' technology in Single Band Standalone Mode.

FIG. 14 shows the inventors' technology configured in a mode which can be used when the system is deployed with cellular only access points. With the system running in this mode, referred to as "Single Band Standalone Mode," cell access point(s) [3] are used to manage the mobile device(s)' [1] cellular communications. The mobile device [1] makes a cellular connection to the cell access point [3] via cell link [7]. The cell access point [3] will then analyze the data stream originating from the mobile device [1] and apply corporate policies to the data stream. Once security policy(s) have been applied to the data stream the cell access point [3] will forward traffic originating from the mobile device [1] to the corporate cellular antenna [10] or will block the attempts at communication as appropriate. If attempts at communications are blocked based on policies different actions can be applied based on the policy configuration (e.g. error code returned to mobile device [1], mobile device [1] redirected to support page). The cell access point [3] is connected to the corporate network via LAN Link [8] for management of the cell access point [3]. In FIG. 14 the corporate internet connection is represented by a corporate cell antenna [10], though other types of corporate internet connections could be used to send traffic destined to the cellular network.

Figure 15A:
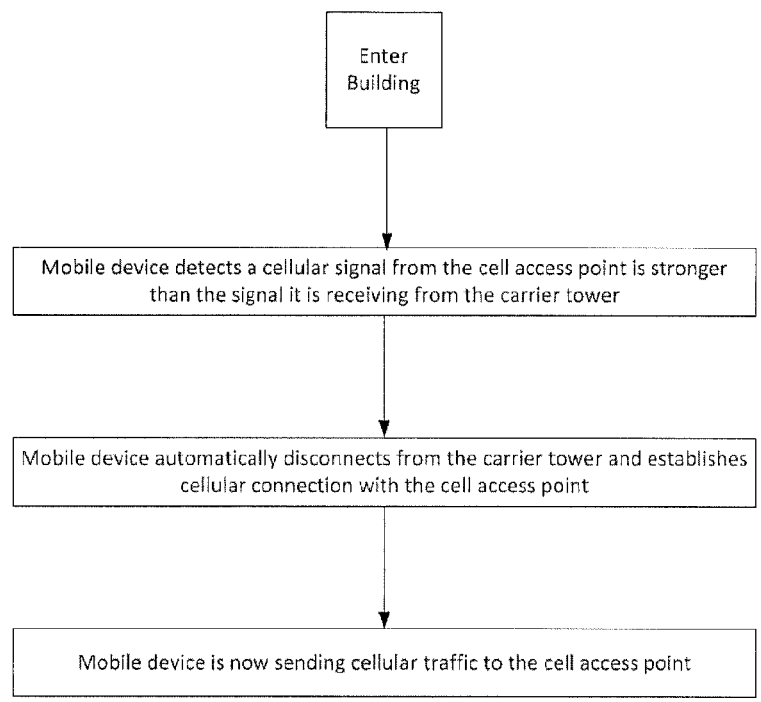
FIG. 15a shows a data processing flow chart of the inventors' technology in Single Band Standalone Mode.
Figure 15B:
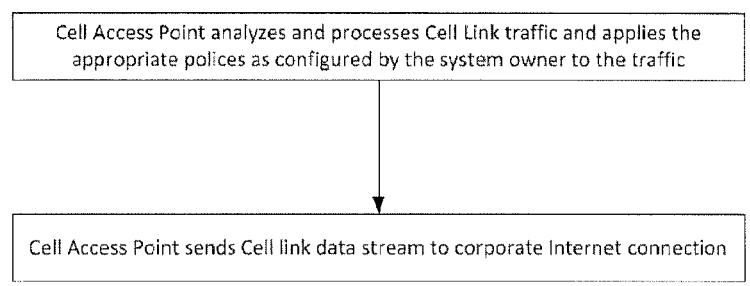
FIG. 15b shows a continuation of data processing flow chart of the inventors' technology in Single Band Standalone Mode.

FIGS. 15a-15b show a data processing flow chart for the inventors' technology configured in Single Band Standalone Mode.

Figure 16:
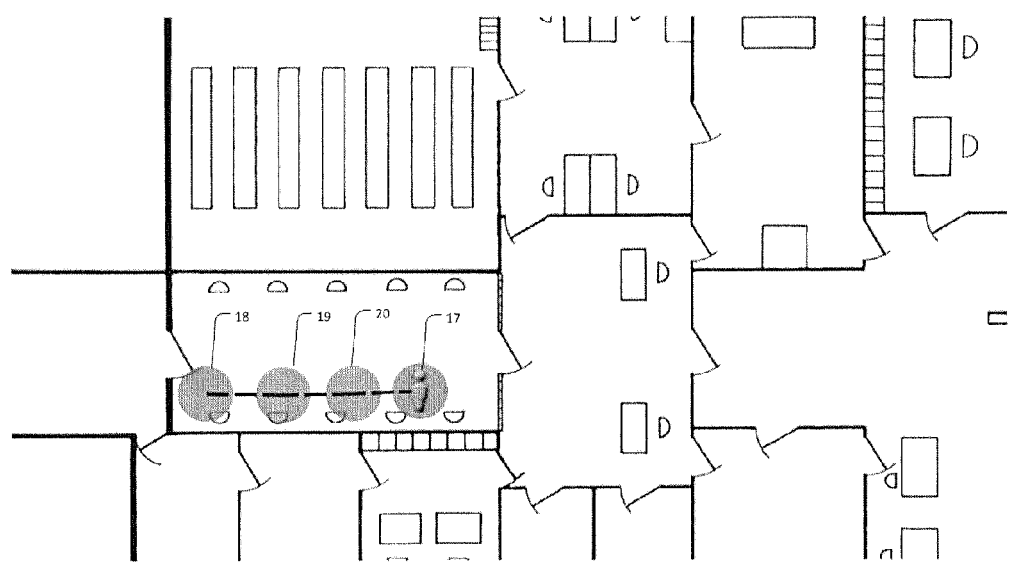
FIG. 16 shows a site survey in progress with 4 samples taken.
Figure 17:
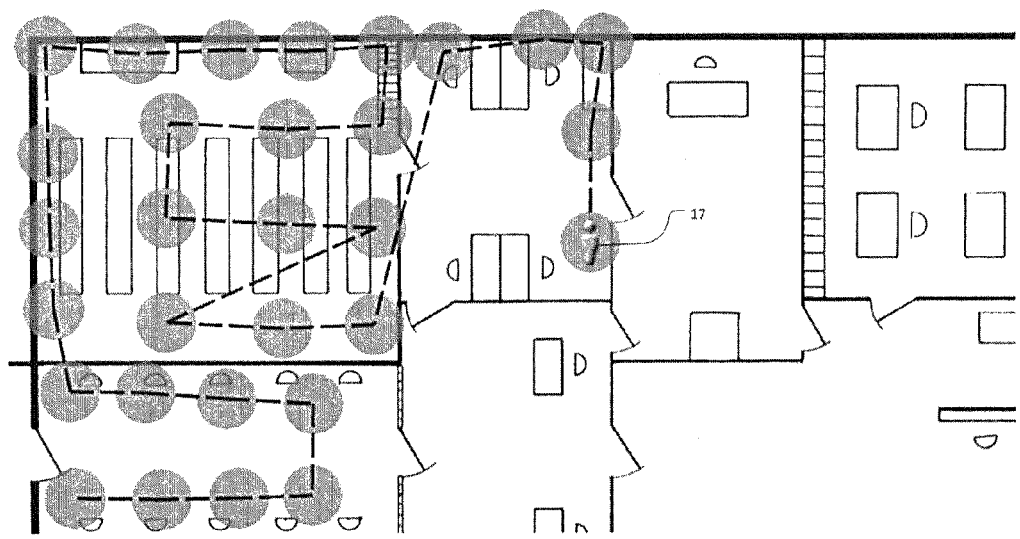
FIG. 17 shows a site survey in progress with 30 samples taken.

Although not required, it is suggested to deploy the inventors' technology in the following manner. To ensure mobile devices automatically move from the carrier tower to the multi-band access point as desired by the system owner, the installer should verify that the cellular signal from the multi-band access point is stronger than the signal from the carrier tower in any location where it is desired for the mobile devices to connect to the multi-band access point instead of the carrier tower. One way to accomplish this is to perform a cellular signal site survey with a tool that will take samples from the carrier tower and/or from the multi-band or cell access point and create a signal heat map. A site survey is a process where the installer will physically move about the site, typically by walking. As the surveyor walks about the site, the surveyor should take care in making sure he/she covers as much of the site as possible. As the surveyor walks about the site he/she will typically use a laptop or mobile device with software designed to record the signal strength of the cellular and/or Wi-Fi signal that is present at the location where the surveyor records a sample. Most site survey software is designed to take many samples recorded from the surveyor and create a heat map. The purpose of the heat map is to give the installer a visual of the cellular and/or Wi-Fi coverage throughout the site. This heat map will aid the installer in tuning the system so it will perform as desired. FIG. 16 and FIG. 17 show images of a site survey in progress. In these two figures you can see the surveyor [17] walk about the site and record signal strength samples. These samples can later be used to generate a heat map similar to the one seen in FIG. 18.

FIG. 16 shows a sample from site survey software with a survey in progress. The installer [17] would walk around the site in every area possible that is to be covered by the corporate cellular and/or Wi-Fi umbrella taking signal strength samples [18, 19, 20] along the way.

FIG. 17 shows a sample from a site survey a little further along than the one shown in FIG. 16. In this sample you can see the surveyor [17] has continued to move throughout the site and record samples. Once the installer has covered the entire site and captured adequate samples, a heat map can be generated from the recordings showing the installer all the areas where the corporate cellular umbrella has a stronger (or weaker) signal than the carrier tower.

Figure 18:
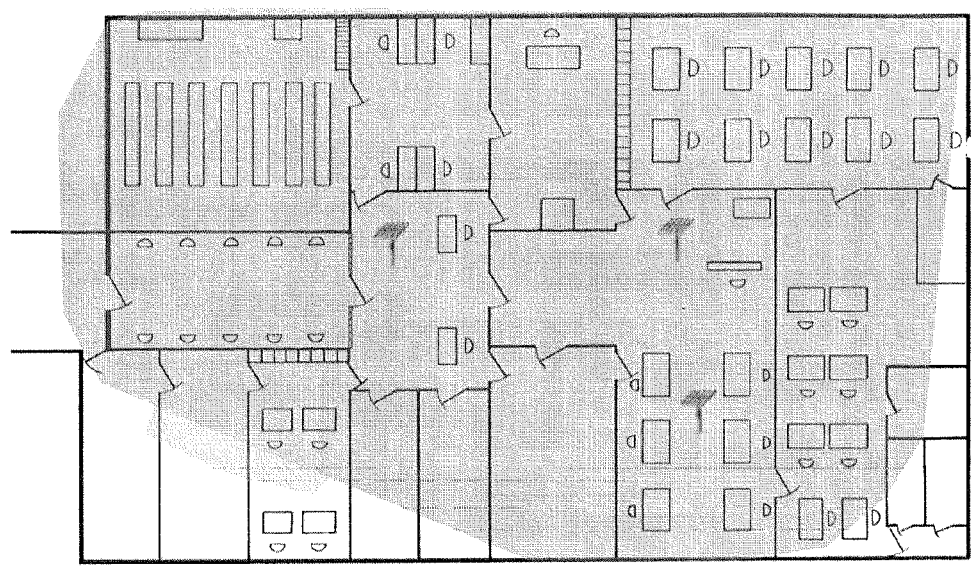
FIG. 18 shows a site survey in progress with a heat map displayed.

FIG. 18 shows a sample heat map from site survey software. In this case the installer can see that the sampled signal does not cover the entire building as indicated by the areas of the site that have no shading. The installer can then use this information to make adjustments to the system such as changing the locations of the multi-band/cell access points, antennas, or adjusting the power output of the multi-band/cell access point radios to fine tune the coverage area to get the desired effect.

It is suggested but not required to deploy the inventors' technology as a complete solution that gives system owners central control and management over both Wi-Fi and cellular communications. It is also possible to install the system to manage only the cellular communications. In this mode the system would use cellular access points instead of multi-band access points.

Other possible applications for the inventors' technology exist outside of business. A few possible applications for the inventors' technology are highlighted in the following diagrams.

Figure 19:
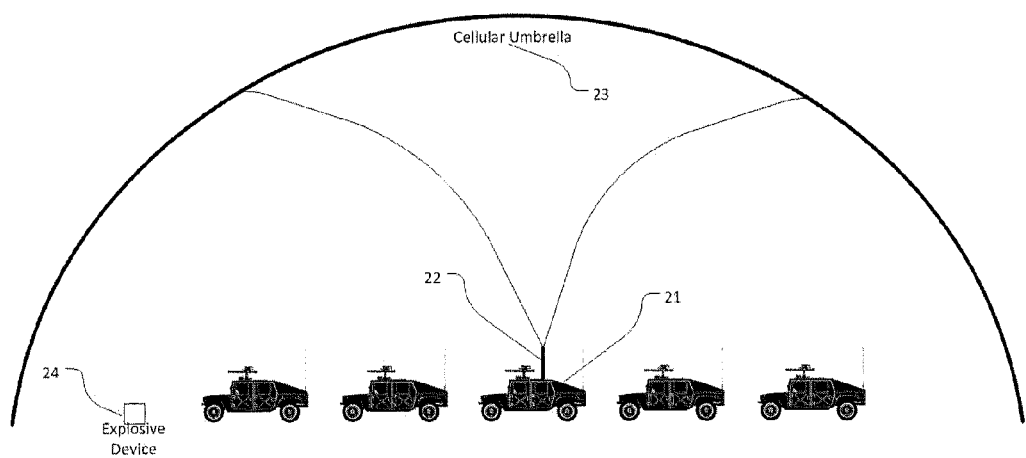
FIG. 19 shows a convoy using the inventors' technology.

FIG. 19 shows a possible scenario of a military convoy. In this case a military truck [21] has a cellular access point [22] installed creating a cellular umbrella [23] over the convoy. There is an explosive device [24] that can be detonated remotely by placing a call over the cellular network to the cell phone built into the explosive device [24]. As the convoy approaches the explosive device [24] it becomes covered under the cellular umbrella [23]. If a call is placed to detonate the explosive device [24] the call could be intercepted by the cellular access point [22] and blocked preventing detonation and thus protecting the convoy as it passes the explosive device [24].

Figure 20:
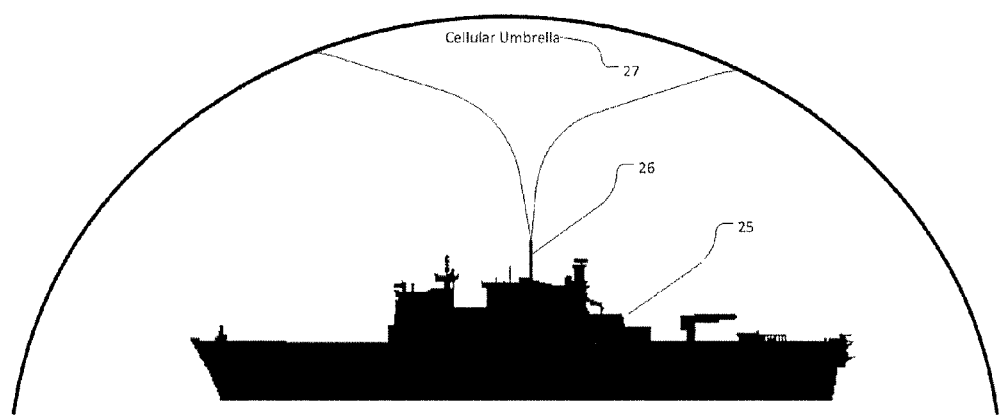
FIG. 20 shows a ship using the inventors' technology.

FIG. 20 shows a possible scenario of a military ship [25]. In this case the military would like to prevent personnel onboard the vessel from making phone calls, sharing vessel location, posting sensitive information on social media sites, and posting videos on the Internet while deployed. The military ship [25] has a cellular access point(s) [26] that creates a cellular umbrella [27] around the ship giving the military the ability to block or monitor unwanted cellular activity by personnel on board.

Figure 21:
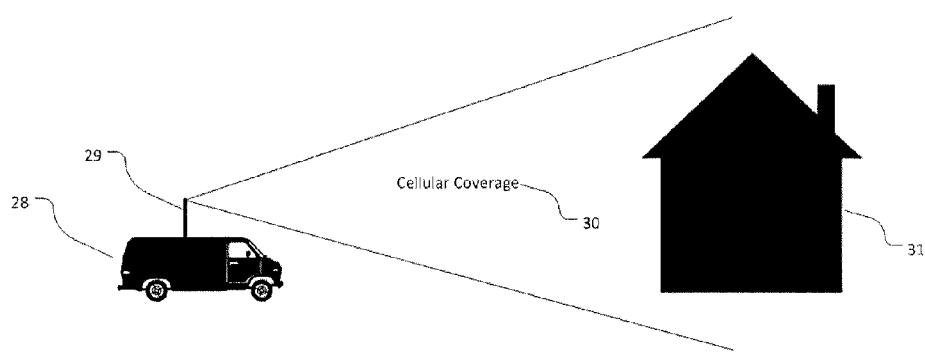
FIG. 21 shows a surveillance van using the inventors' technology.

FIG. 21 shows a possible scenario of a surveillance van [28] monitoring activity in a house [31]. In this case the surveillance van [28] occupants would like to intercept any cellular activity occurring inside the house [31] and has been equipped with a cellular access point [29] to provide cellular coverage [30] over the house [31]. All cellular enabled devices inside the house [31] would automatically be connected to the cellular access point [29] installed on the surveillance van [28] which can be monitored by the occupants of the surveillance van [28].

Figure 22:
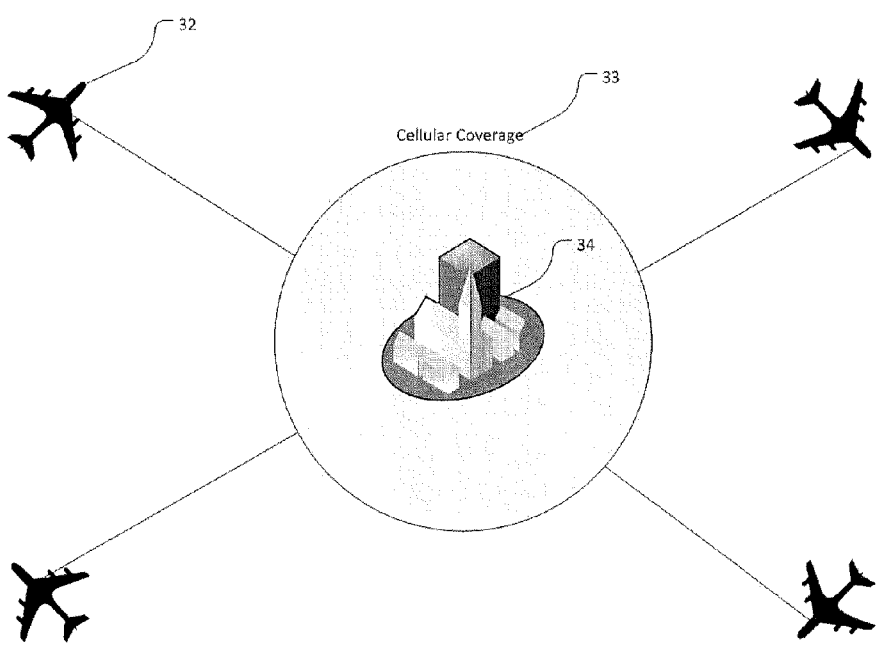
FIG. 22 shows airplanes using the inventors' technology.
Figure 30:
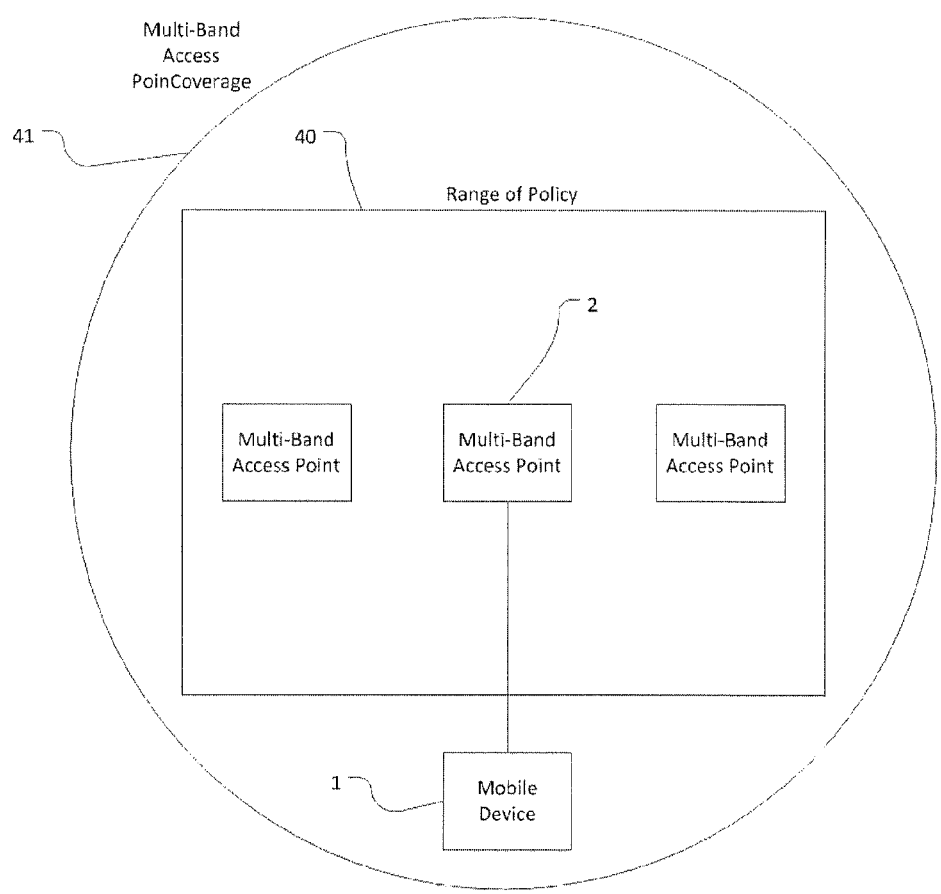
FIG. 30 shows a block diagram illustrating one embodiment of multi-band access points in accordance with the present invention.

FIG. 22 shows a possible scenario of aircraft [32] equipped with cellular access points working together to provide cellular coverage [33] over a large geographical area such as a small town [34]. In this scenario the aircraft [32] is owned by the military and the town [34] is an area of military operations. The military wants to monitor all cellular activity occurring in the town [34] to aid in accomplishing the mission. FIG. 30 is a block diagram illustrating one architecture for enforcing a policy from a multi-band access point [2] to a mobile device [1]. The range of the policy [40] is defined as a perimeter or distance from the multi-band access point(s) [2]. Thus, the present set of policies controlling a given wireless device [1] can depend on the distance from the multi-band access points [2]. As FIG. 30 illustrates, policies would not apply to the mobile device [1] that is outside the range of the policy [40] even though the device is within multi-band access point coverage [41] and capable of associating with the multi-band access points [2]. This architecture is advantageous when multi-band access point coverage [41] extends beyond a business premise (e.g., a sidewalk in front of a business) but an association and subsequent policies are not desired outside the business premise. In some embodiments, the multi-band access points [2] could be mobile just like the mobile device [1]. However, the localization schemes described above may still be utilized in order to determine the policies applicable to the wireless device [1]. Instead of implementing a fixed boundary geographic location, differences between the location of the wireless device [1] and the multi-band access points [2] can be used in order to determine the range of policy [40]. For example, if the distance between devices is less than or equal to the range designated for the policy, then the policy applies to the mobile device [1]. Conversely, if the mobile device [1] is located at a farther distance than the maximum range of the policy, the policy will not apply. One example of where this is advantageous is military application (e.g., a convoy). Note that the mobile device [1] and multi-band access points [2] may be moving relative to one another and the mobile device [1] may experience phasing in and out of enforcement of the policies.

Figure 31:
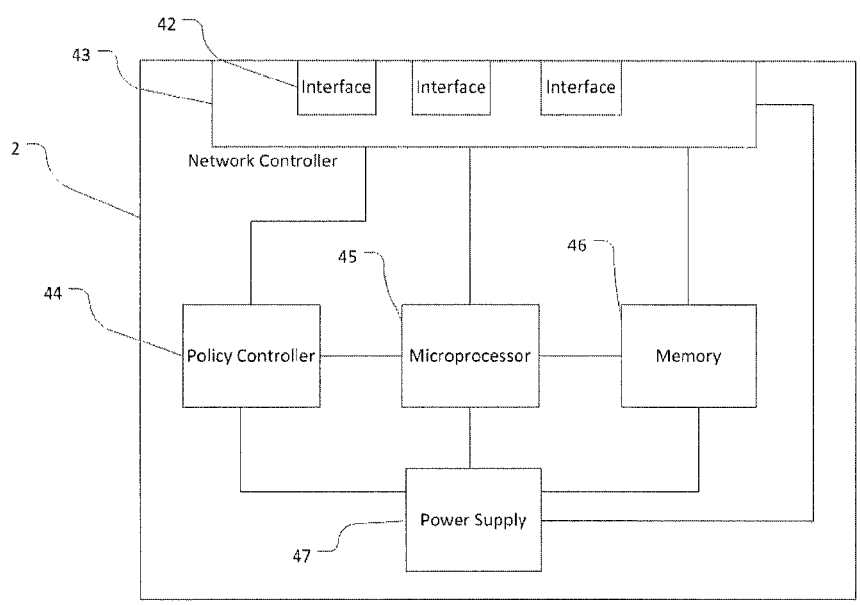
FIG. 31 shows a block diagram illustrating one embodiment of the component makeup of a multi-band access point.

FIG. 31 is a block diagram illustrating one possible configuration of a multi-band access point. As FIG. 31 illustrates, the multi-band access point [2] comprises interface(s) [42], network controller [43], policy controller [44], microprocessor [45], memory (e.g., volatile and non-volatile) [46], and a power supply [47]. The microprocessor [45] is adapted to perform basic processing operations of the multi-band access point [2]. Memory [46] is adapted to store signals as bits of data. The power supply [47] is adapted to provide a source of power to the various components of the multi-band access point [2]. The network controller [43] facilitates communications with one or more remote devices via the plurality of data/communications interfaces [42]. These devices could support wired and/or wireless (e.g., air interfaces) protocols such as Ethernet, Wi-Fi, or cellular. The policy controller [44] comprises of logic adapted to analyze traffic from associated devices and apply determined policies to that traffic. In one embodiment, the policy controller [44] is resident on or housed within the network controller [43]. In a second embodiment, the policy controller [44] exists as a stand-alone circuit or logic board electrically coupled to the other components as required. In a third embodiment, the policy controller [44] comprises one or more software modules resident in one or more memory sources, such as the memory [46]. In yet another embodiment, the policy controller [44] comprises one or more software modules resident in one or more removable memory sources, such as compact flash or USB flash drives. In one embodiment, the policy controller [44] comprises logic adapted to analyze and block or allow traffic from associated devices based on determined policies (e.g., content filtering, antivirus, security). In some embodiments, the policy controller [44] comprises zone information (such as an applicable range of GPS coordinates), the type of policy to be applied, and/or the classes of users which are to be affected by the policy.

Figure 32A:
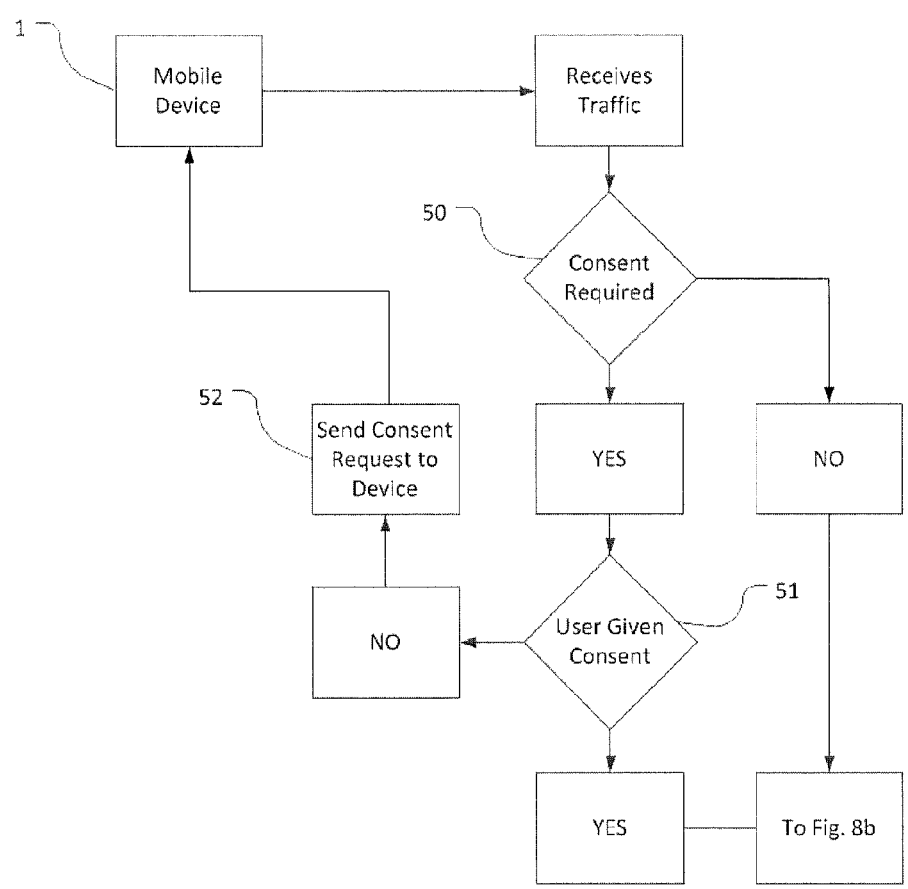
FIG. 32a shows a logical flow diagram illustrating one possible data processing configuration in accordance with the present invention.

FIG. 32a is a logical flow diagram illustrating a potential method of determining if user consent is required for the mobile device to pass traffic (e.g., voice, data, sms). In an embodiment following FIG. 32a, the mobile device [1] makes an association to an access point or multi-band access point via air connection. Once the mobile device [1] attempts to send or receive communications (e.g., voice, data, sms) the invention checks to see if there is a policy defined that requires user consent [50] either on a controller or access point depending on the method in which the system is deployed. If consent is not required traffic is allowed to continue. If consent is required (e.g., because the system is deployed in a jurisdiction which requires explicit opt-in consent before policies could be applied to wireless communications) the embodiment checks to see if consent has been granted [51]. This check can be performed, for example, by querying a database which contains MAC addresses of devices for individuals who have consented to policy application (e.g., employees who have consented to policy application in an employment agreement), and checking if the MAC address of the device trying to send or receive communications is present in the database. If consent has been granted traffic is allowed to continue. If consent has not been granted a consent request [52] is returned to the mobile device [1].

Figure 32B:
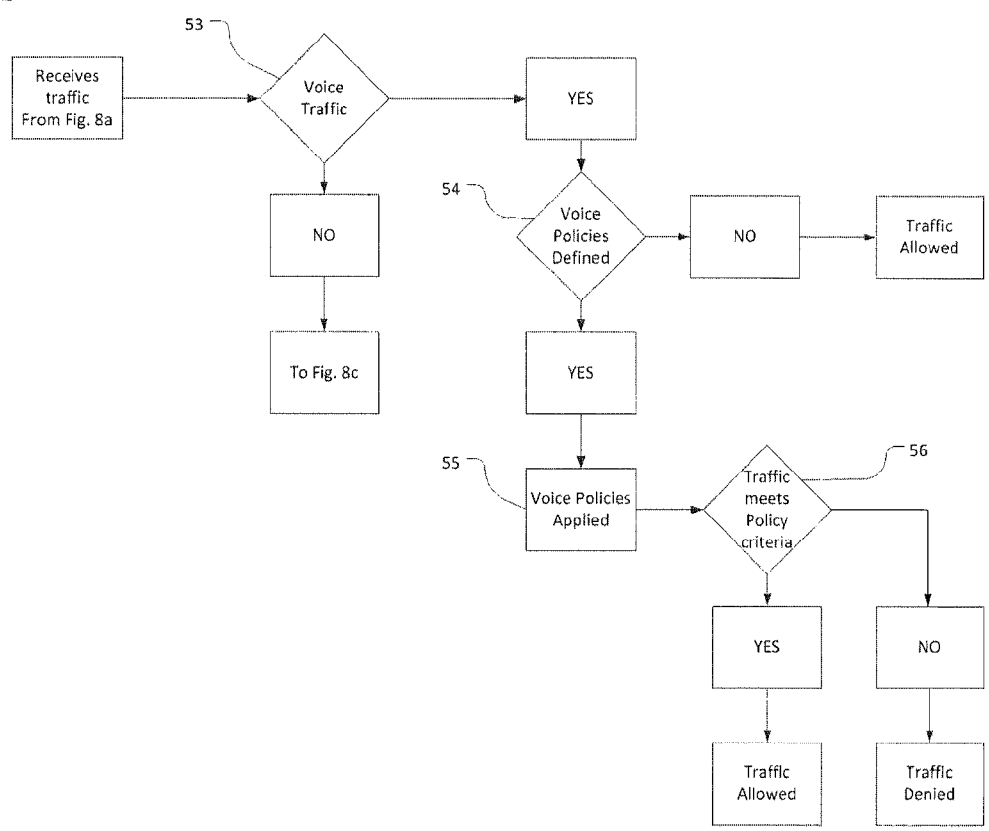
FIG. 32b shows a logical flow diagram illustrating one possible data processing configuration in accordance with the present invention.

FIG. 32b is a logical flow diagram illustrating a potential method of determining if traffic received from a mobile device is voice traffic. Initially, an embodiment following the method of FIG. 32b will determine if the traffic is voice traffic [53]. If it is not voice traffic it is allowed to continue. If the embodiment determines that the traffic is voice traffic, it determines if there is a voice policy defined [54] that would apply to the traffic. If there is no voice policy defined, or if the voice policy does not apply to the voice traffic, the traffic is allowed to continue. If the embodiment determines that a policy should apply, the voice policies are applied [55]. Once the voice policies are applied [55] the embodiment determines if the traffic meets the policy criteria [56]. If it does not meet the policy criteria the traffic is blocked. If it does meet the policy criteria the traffic is allowed to continue.

Figure 32C:
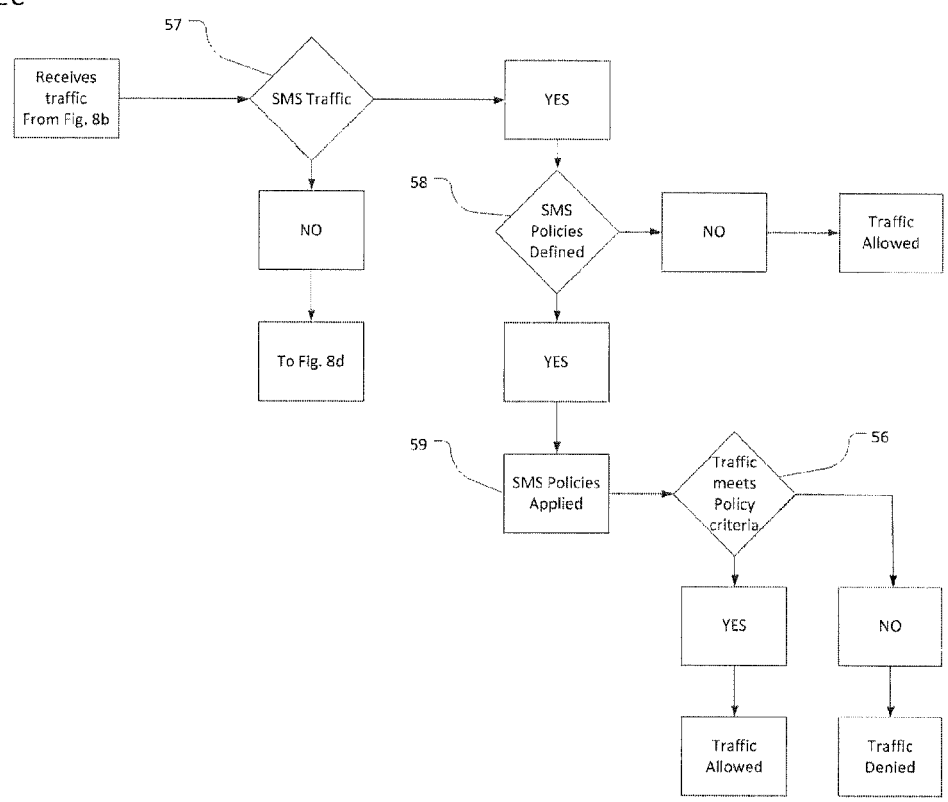
FIG. 32c shows a logical flow diagram illustrating one possible data processing configuration in accordance with the present invention.

FIG. 32c is a logical flow diagram illustrating a potential method of determining if traffic received from a mobile device is SMS traffic. Initially, an embodiment following the method of FIG. 32c will determine if the traffic is SMS traffic [57]. If it is not SMS traffic it is allowed to continue. If the embodiment determines that the traffic is SMS traffic, it determines if there is a SMS policy defined [58] that would apply to the traffic. If there is no SMS policy defined, or if the SMS policy does not apply to the SMS traffic, the traffic is allowed to continue. If the embodiment determines that a policy should apply, the SMS policies are applied [59]. Once the SMS policies are applied [59] the embodiment determines if the traffic meets the policy criteria [56]. If it does not meet the policy criteria the traffic is blocked. If it does meet the policy criteria the traffic is allowed to continue.

Figure 32D:
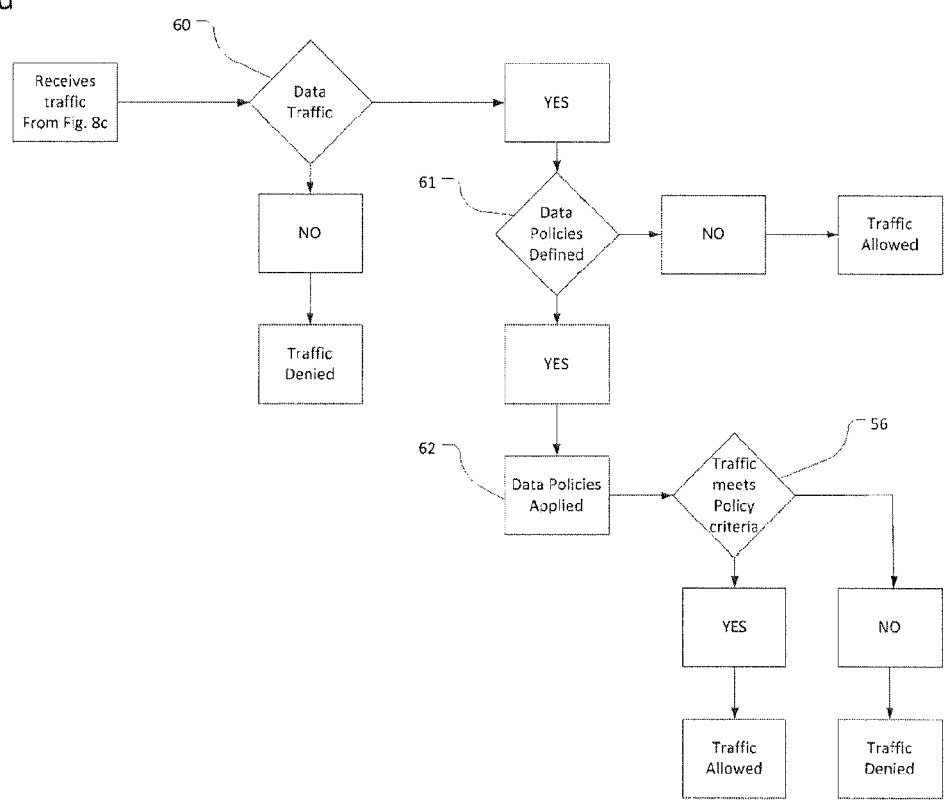
FIG. 32d shows a logical flow diagram illustrating one possible data processing configuration in accordance with the present invention.

FIG. 32d is a logical flow diagram illustrating a potential method of determining if traffic received from a mobile device is data traffic. Initially, an embodiment following the method of FIG. 32d will determine if the traffic is data traffic [60]. If it is not data traffic it is blocked. If the embodiment determines that the traffic is data traffic, it determines if there is a data policy defined [61] that would apply to the traffic. If there is no data policy defined, or if the data policy does not apply to the data traffic, the traffic is allowed to continue. If the embodiment determines that a policy should apply, the data policies are applied [62]. Once the data policies are applied [62] the embodiment determines if the traffic meets the policy criteria [56]. If it does not meet the policy criteria the traffic is blocked. If it does meet the policy criteria the traffic is allowed to continue.

Figure 23:
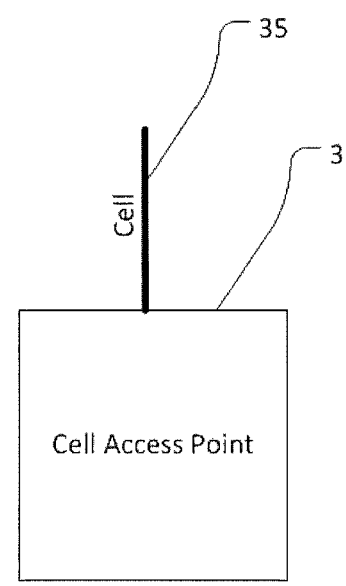
FIG. 23 shows a single attached cell antenna on a cell access point.
Figure 24:
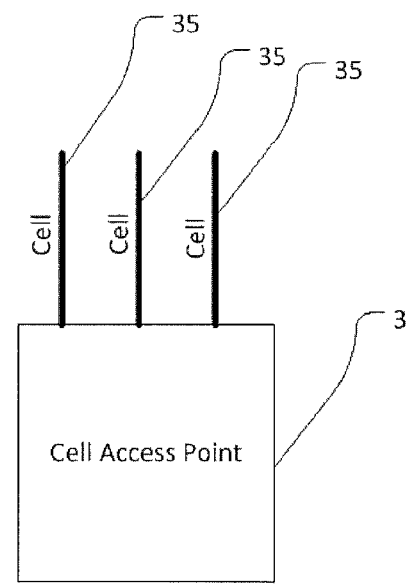
FIG. 24 shows multiple attached cell antennas on a cell access point.
Figure 25:
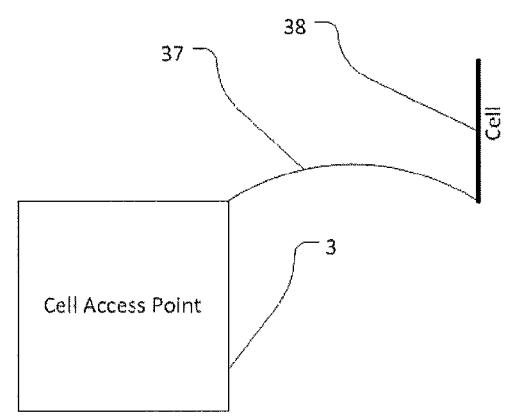
FIG. 25 shows a single external cell antenna on a cell access point.
Figure 26:
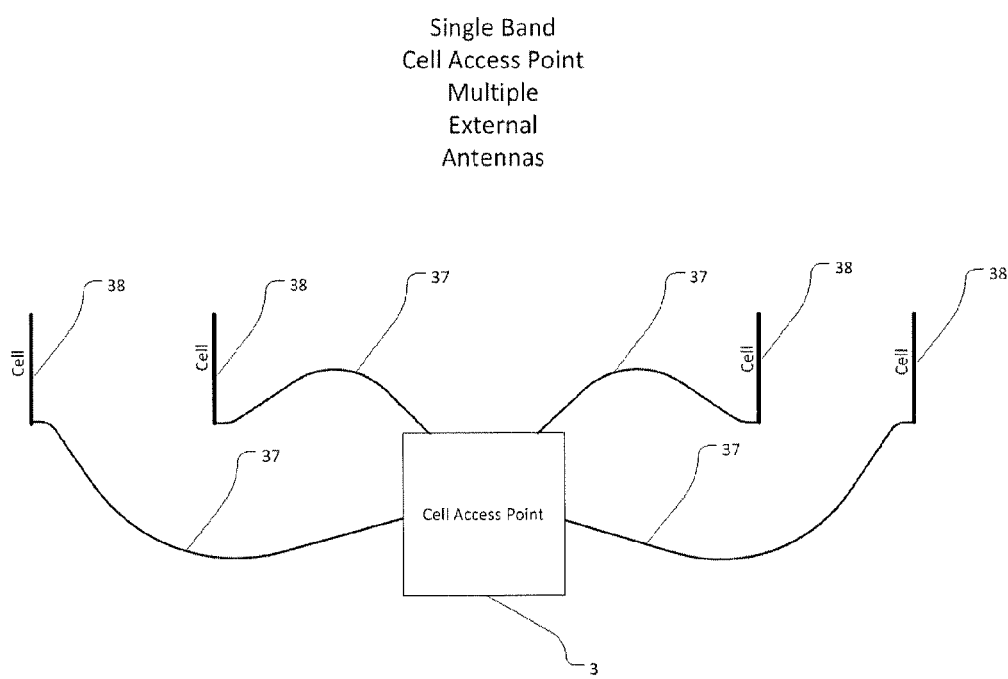
FIG. 26 shows multiple external cell antennas on a cell access point.
Figure 27:
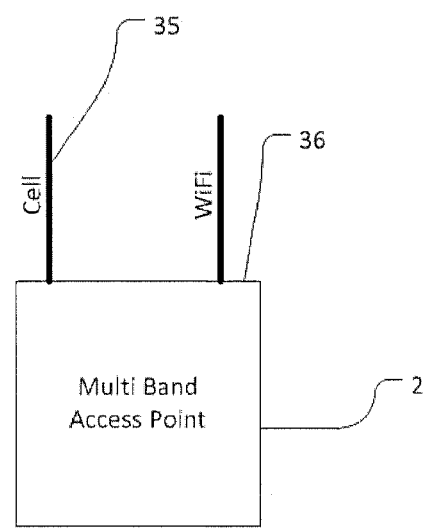
FIG. 27 shows single attached cell and Wi-Fi antennas on a multi-band access point.
Figure 28:
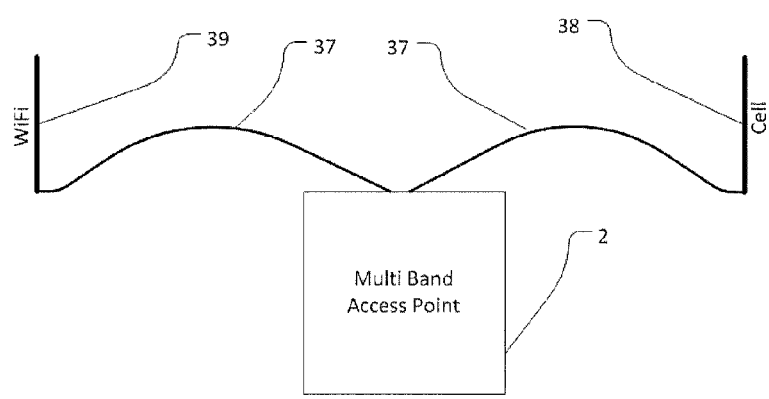
FIG. 28 shows single external cell and Wi-Fi antennas on a multi-band access point.
Figure 29:
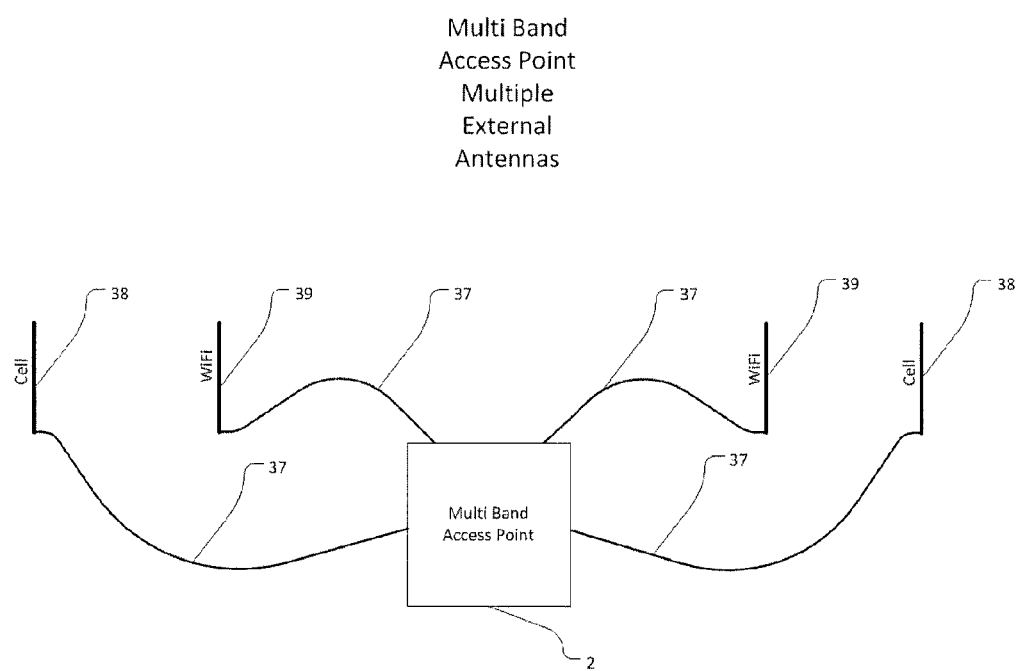
FIG. 29 shows multiple external cell and Wi-Fi antennas on a multi-band access point.

The inventors' technology can be implemented using different antenna configurations, including internal, attached, and external. Additionally different types of antennas are compatible such as omnidirectional, directional, patch, yagi, etc. FIG. 23 shows a cell access point [3] with a single attached antenna [35]. FIG. 24 shows a cell access point [3] with multiple attached antennas [35]. FIG. 25 shows a cell access point [3] with an external cell antenna [38] connected via suitable cable [37] such as low loss coax. FIG. 26 shows a cell access point [3] with multiple external antennas [38] connected via suitable cables [37] such as low loss coax. FIG. 27 shows a multi-band access point [2] with single attached cell [35] and Wi-Fi [36] antennas. FIG. 28 shows a multi-band access point [2] with single external cell [38] and Wi-Fi [39] antennas connected via suitable cable [37] such as low loss coax. FIG. 29 shows multiple external cell [38] and Wi-Fi [39] antennas connected via suitable cable [37] such as low loss coax.

In addition to the above antenna examples, cellular access points and multi band access points can use any combination of internal, attached, and external antennas as needed by the system owner.

Aspects of the technology disclosed herein can be controlled by software. As such the disclosed technology can be used to deploy a flexible system that should be configured to abide by all laws including wire tapping laws. Safeguards can be put in place with the software that can notify owners of mobile devices that their mobile device activities can be monitored and controlled. Some examples the inventors' technology can be configured to present a notification on each mobile device as it enters the coverage umbrella notifying the owner of the mobile device that their activities are about to be monitored. The system can also be configured to allow owners of the mobile devices to agree to or opt out of the monitoring, and bypass the system all together. Other features such as MAC address filtering, which is an address that identifies devices, can be used to control which device fall under the control of the inventors' technology. The inventors' technology can work with a variety of antennas that will give system owners the ability to shape the coverage provided by the inventors' technology.

To avoid any ambiguity in the scope of protection sought, the claims are set forth using certain terms and phrases not explicitly defined above. Such terms and phrases should be understood according to their broadest reasonable interpretation as shown by a general purpose dictionary, and the explicit definitions set forth below under the heading "Explicit Definitions." To the extent that the interpretation which would be given to such terms or phrases based on the above disclosure is in any way narrower than the broadest reasonable interpretation as shown by a general purpose dictionary and the "Explicit Definitions" set forth below, the broadest reasonable interpretation and the "Explicit Definitions" shall control, and the narrower meaning shall have no effect.

EXPLICIT DEFINITIONS

When used in the claims, "corporate Internet connections" should be understood to refer to any connection that can connect the network in which the inventors' technology is deployed to the Internet. For example, one type of corporate internet connection could be a business Internet connection (e.g. T1, MPLS, EVPN, DSL, Cable, or other Broadband). Another type of corporate Internet connection could be a cellular antenna. Another type of corporate Internet connection could be a cellular data card. Another type of corporate Internet connection could be a device capable of a mobile hot spot. In some embodiments multiple connections could be used simultaneously (e.g. broadband and cellular antenna). In another embodiment multiple connections could be used in a standby or failover configuration.

When used in the claims, a "computer" should be understood to refer to a device or group of devices (e.g., a processor and a memory) which is capable of performing one or more logical and/or physical operations on data to produce a result. "Computer" as defined herein should be understood as including laptop computers, desktop computers, tablet computers, servers, smartphones, controllers, and access points capable of manipulating data.

When used in the claims, "configured" should be understood to mean that the thing "configured" is adapted, designed, or modified for a specific purpose. As an example of "configuring" in the context of computer is to provide a computer with specific data (which may include instructions) which can be used in performing the specific acts the computer is being "configured" to do. For example, installing Microsoft WORD on a computer "configures" the computer to function as a word processor, which it does by using the instructions for Microsoft WORD in combination with other inputs, such as an operating system, and various peripherals (e.g., a keyboard, monitor, etc).

When used in the claims, a "means for applying policies" should be understood as a means+function limitation as provided for in 35 U.S.C. §112 ¶ 6, in which the function is "applying policies" and the corresponding structure is a computer configured to perform processes such as illustrated in FIGS. 32b-32d.

When used in the claims, a "processing system" should be understood as a set of one or more connected computers. In cases where a "processing system" is described as performing one or more acts, it should be understood that those acts could be performed by individual computers in the system, or by the system collectively through the combined action of multiple computers.

Accordingly, we claim:

1. A communication control system configured to allow a business to apply content control policies to all wireless communications received or sent by mobile devices within a circumscribed geographic area controlled by the business, the communication control system comprising:
  a. one or more corporate Internet connections;
  b. a processing system configured to perform a set of acts comprising:
    i. receiving, via one or more access points configured to receive communications from the mobile devices in the circumscribed geographic area controlled by the business, communications transmitted by the mobile devices within the circumscribed geographic region via one or more communication channels, wherein the one or more communication channels comprise a cellular channel provided by a third party wireless network provider, and wherein the one or more access points are configured to transmit, to the mobile devices within the circumscribed geographic area, a cellular signal stronger than a cellular signal provided by the third party wireless network provider in the circumscribed geographic area, causing any of the mobile devices in the circumscribed geographic region to be redirected to an access point of the one or more access points and unable to make a direct connection to the third party wireless network provider;
    ii. applying one or more policies to the communications received from the mobile devices, wherein applying the one or more policies comprises, for communications comprising requests for content to be provided via a network controlled by the third party wireless network provider, comparing the requests for content with a filtering policy comprising one or more restricted network destinations;
    iii. blocking communications not conforming to one or more policies, wherein, for communications comprising requests for content to be provided via the network controlled by the third party wireless network provider, blocking communications not conforming to one or more policies comprises preventing the communications from reaching the network controlled by the third party wireless network provider based on application of one or more policies to those communications; and
    iv. permitting communications conforming to the one or more policies, wherein, for communications comprising requests for content to be provided via the network controlled by the third party wireless network, permitting communications comprises sending the communications to the third party wireless network via a corporate Internet connection from the one or more corporate Internet connections.

2. The communication control system of claim 1 wherein:
  a. the one or more communication channels comprises a Wi-Fi link; and
  b. for communications transmitted via the Wi-Fi link, permitting communications comprises sending the communications to a local area network.

3. The communication control system of claim 2, wherein:
  a. the processing system comprises the one or more access points and one or more controllers;
  b. the processing system is configured to receive communications transmitted by the mobile devices via the Wi-Fi link and the cellular channel at the one or more access points;
  c. the is one or more access points are configured to send the communications transmitted by the mobile devices to the one or more controllers;
  d. the processing system is configured to perform the acts of:
    i. blocking communications not conforming to the one or more policies; and
    ii. permitting communications conforming to the one or more policies;
  with the one or more controllers.

4. The communication control system of claim 3, wherein:
  a. the access point is configured to:
    i. convert the communications transmitted by the mobile devices via the cellular channel to a format suitable for transmission over the local area network; and
    ii. send the communications transmitted by the mobile devices to the controller via the local area network;
  b. sending communications transmitted by the mobile devices via the cellular channel which conform to the one or more policies to the corporate Internet connection from the one or more corporate Internet connections comprises sending the communications transmitted by the mobile devices via the cellular channel which conform to the one or more policies from a first access point from the one or more access points to a second access point from the one or more access points;
  c. the second access point is configured to convert communications sent to the corporate Internet connection through it to a format suitable for the network controlled by the third party wireless network provider.

5. The communication control system of claim 3, wherein:
  a. the controller is configured to convert the communications transmitted by the mobile devices via the cellular channel to a format suitable for transmission over the local area network;
  b. sending communications transmitted by the mobile devices via the cellular channel which conform to the one or more policies to the corporate Internet connection from the one or more corporate Internet connections comprises sending the communications transmitted by the mobile devices via the cellular channel which conform to the one or more policies through a second controller via the local area network;
  c. the second controller is configured to convert communications sent to the corporate Internet connection through it to a format suitable for the network controlled by the third party wireless network provider.

6. The communication control system of claim 2, wherein:
a. the processing system comprises the one or more access points;
b. the processing system is configured to perform the acts of:
  i. receiving communications transmitted by the mobile devices via the one or more communication channels;
  ii. blocking communications not conforming to the one or more policies; and
  iii. permitting communications conforming to the one or more policies;
  at the one or more access points;
c. the on or more access points are further configured to perform an additional set of acts comprising:
  i. receiving management instructions specifying the one or more policies via the local area network; and
  ii. converting the communications transmitted by the mobile devices via the cellular channel to a format suitable for transmission over the local area network;
d. sending communications transmitted by the mobile devices via the cellular channel which conform to the one or more policies to the corporate Internet connection from the one or more corporate Internet connections comprises sending the communications transmitted by the mobile devices via the cellular channel which conform to the one or more policies from a first access point from the one or more access points to a second access point from the one or more access points; and
e. the second access point is configured to convert communications sent to the corporate Internet connection through it to a format suitable for the network controlled by the third party wireless network provider.

7. The communication control system of claim 1, wherein:
a. the processing system comprises the one or more access points and one or more controllers;
b. the processing system is configured to perform the act of receiving communications transmitted by the mobile devices via the cellular channel at the one or more access points;
c. the one or more access points are further confirmed to perform the additional act of sending the communications transmitted by the mobile devices via the cellular channel to the one or more controllers;
d. the processing system is configured to perform the acts of:
  i. blocking communications not conforming to the one or more policies; and
  ii. permitting communications conforming to the one or more policies;
  with the one or more controllers;
e. the one or more access points are configured to communicate with the one or more controllers via a cell link;
f. the controller is configured to communicate with the corporate Internet connection via cell link; and
g. the one or more controllers are configured to receive management instructions specifying the one or more policies via a local area network.

8. The communication control system of claim 1, wherein:
a. the processing system comprises the one or more access points;
b. the processing system is configured to perform the acts of:
  i. receiving communications transmitted by the mobile devices via the one or more communication channels;
  ii. blocking communications not conforming to the one or more policies; and
  iii. permitting communications conforming to the one or more policies;
  at the one or more access points;
c. the one or more access points are further configured to perform the additional act of receiving management instructions specifying the one or more policies via a local area network; and
d. the one or more access points are configured to communicate with the corporate Internet connection via cell link.

9. The communication control system of claim 1, wherein the processing system is configured to perform the acts of blocking communications not conforming to the one or more policies and permitting communications conforming to the one or more policies using a means for applying policies.

10. The communication control system of claim 9, wherein the means for applying policies is incorporated in a communication system component taken from the set of components consisting of:
a. an access point from the one or more access points; and
b. a controller.

11. The communication control system of claim 1, wherein the processing system is configured to:
a. block communications not conforming to the one or more policies from the mobile devices; and
b. allow communications conforming to the one or more policies from the mobile devices.

12. A method of allowing a business to apply content control policies to all wireless communications received or sent by mobile devices within a circumscribed geographic area controlled by the business, the method comprising:
a. receiving a first communication from a mobile device of the mobile devices via one or more access points configured to receive communications from the mobile devices in the circumscribed geographic area, wherein the first communication was transmitted by the mobile device via one or more communication channels, wherein the one or more communication channels comprise a cellular channel provided by a third party wireless network operator, and wherein the one or more access points are configured to transmit, to the mobile devices within the circumscribed geographic area, a cellular signal stronger than a cellular signal provided by the third party wireless network operator in the circumscribed geographic area, causing any of the mobile devices in the circumscribed geographic region to be redirected to an access point of the one or more access points and unable to make a direct connection to the third party wireless network operator, wherein the first communication comprises a request for content to be provided to the mobile device via the external wireless network controlled by the third party wireless network operator;
b. applying one or more policies to the first communication, wherein applying one or more policies comprises comparing the request for content comprised by the first communication with a filtering policy comprising one or more restricted network destinations;
c. based on determining that the first communication conforms to the one or more policies, allowing the first communication by performing acts comprising sending the first communication to the third party wireless network operator via a corporate Internet connection.

13. The method of claim 12, wherein the method further comprises:

a. receiving a second communication from a second mobile device, wherein the second mobile device corresponds to a record in a database of mobile devices authorized to access a corporate network comprising the corporate Internet connection, and wherein the second communication comprises a request for content to be provided to the second mobile device via the external network controlled by the third party wireless network operator;

b. applying one or more policies to the second communication, wherein applying one or more policies to the second communication comprises comparing the request for content comprised by the second communication with the filtering policy comprising one or more restricted network destinations;

c. based on determining that the second communication does not conform to the one or more policies, blocking the second communication by performing acts comprising preventing the second communication from reaching the third party wireless network operator.

14. A communications control system configured to allow a business to apply content control policies to all wireless communications received or sent by mobile devices within a circumscribed geographic area controlled by the business, the communication control system comprising:

a. one or more corporate Internet connections;

b. means for receiving and selectively allowing wireless communications from the mobile devices within the circumscribed geographic area controlled by the business, said means comprising a processing system configured to perform a set of acts comprising:

i. receiving, via one or more access points configured to receive communications from the mobile devices in the circumscribed geographic area controlled by the business, communications transmitted by the mobile devices within the circumscribed geographic region via one or more communication channels, wherein the one or more communication channels comprise a cellular channel provided by a third party wireless network provider, and wherein the one or more access points are configured to transmit, to the mobile devices within the circumscribed geographic area, a cellular signal stronger than a cellular signal provided by the third party wireless network provider in the circumscribed geographic area, causing any of the mobile devices in the circumscribed geographic region to be redirected to an access point of the one or more access points and unable to make a direct connection to the third party wireless network provider; and ii. applying one or more policies to the communications received from the mobile devices, wherein applying the one or more policies comprises, for communications comprising requests for content to be provided via a network controlled by the third party wireless network provider, comparing the requests for content with a filtering policy comprising one or more restricted network destinations;

iii. allowing or blocking communications based on whether the communications conform to the one or more policies; and c. an internal network operable to provide, to the one or more corporate Internet connections, communications received by the means for receiving and selectively allowing wireless communications from the mobile devices within the circumscribed geographic area controlled by the business.

15. The communications control system of claim 14 wherein the means for receiving and selectively allowing wireless communications from mobile devices within the circumscribed geographic area controlled by the business is configured to:

a. block communications not conforming to the one or more policies from the mobile devices; and b. allow communications conforming to the one or more policies from the mobile devices.

\* \* \* \* \*

UNITED STATES PATENT AND TRADEMARK OFFICE
CERTIFICATE OF CORRECTION

| | | |
|---|---|---|
| PATENT NO. | : 8,660,536 B1 | Page 1 of 1 |
| APPLICATION NO. | : 13/708084 | |
| DATED | : February 25, 2014 | |
| INVENTOR(S) | : Jeremy Pogue et al. | |

It is certified that error appears in the above-identified patent and that said Letters Patent is hereby corrected as shown below:

In the Claims:

Column 16, Claim 3, line 22, reads "...the is one or more..."; which should be deleted and replaced with "...the one or more..."

Column 17, Claim 6, line 15, reads "...the on or more..."; which should be deleted and replaced with "...the one or more..."

Signed and Sealed this
Twenty-seventh Day of May, 2014

Michelle K. Lee
*Deputy Director of the United States Patent and Trademark Office*